(12) United States Patent
Alhawaj et al.

(10) Patent No.: US 11,140,155 B2
(45) Date of Patent: Oct. 5, 2021

(54) METHODS, COMPUTER READABLE MEDIA, AND SYSTEMS FOR AUTHENTICATION USING A TEXT FILE AND A ONE-TIME PASSWORD

(71) Applicant: Imam Abdulrahman Bin Faisal University, Dammam (SA)

(72) Inventors: Reem Z. Alhawaj, Dammam (SA); Maram I. Al Qasim, Dammam (SA); Ghena T. Al-Ghussein, Dammam (SA); Nouf M. Alshehri, Dammam (SA); Ghadeer M. Al-Sahwan, Dammam (SA); Abdullah Mohammed Almuhaideb, Dammam (SA); Norah Ahmed Almubairik, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 249 days.

(21) Appl. No.: 16/195,972

(22) Filed: Nov. 20, 2018

(65) Prior Publication Data

US 2020/0162451 A1 May 21, 2020

(51) Int. Cl.
*H04L 29/06* (2006.01)
*H04L 9/32* (2006.01)
*G06F 21/45* (2013.01)

(52) U.S. Cl.
CPC .......... *H04L 63/0838* (2013.01); *G06F 21/45* (2013.01); *H04L 9/3236* (2013.01); *H04L 63/18* (2013.01); *H04L 2463/082* (2013.01)

(58) Field of Classification Search
CPC ... H04L 63/0838; H04L 63/18; H04L 9/3236; H04L 2463/082; H04L 63/12;
(Continued)

(56) References Cited

U.S. PATENT DOCUMENTS 5,719,941 A * 2/1998 Swift ...................... G06F 21/31
340/5.54
6,826,686 B1 * 11/2004 Peyravian ............... G06F 21/31
713/168

(Continued)

OTHER PUBLICATIONS

Al-Sahwan et al. "A Strong and Practical Authentication Mechanism Using PassText and OTP." 2018 21st Saudi Computer Society National Computer Conference (NCC). (Year: 2018).*

(Continued)

*Primary Examiner* — Sarah Su
(74) *Attorney, Agent, or Firm* — Oblon, McClelland, Maier & Neustadt, L.L.P.

(57) ABSTRACT

Methods, systems, and computer readable media for authentication using a text file and a one-time password are described. A method includes receiving user credentials and providing initial text for modification then generating first and second hash values based on a hash function of the initial and modified texts, and comparing the hash values and creating a record in a user table to store information corresponding to the user including the second hash value, wherein the information includes the modified text if the texts do not match; then sending a user a first one-time password via email to verify that the user is an owner of an email address provided by the user.

20 Claims, 30 Drawing Sheets

(58) Field of Classification Search
CPC ..... H04L 9/3239; H04L 9/3228; G06F 21/45; G06F 2221/2131; G07C 21/31
See application file for complete search history.

(56) References Cited

U.S. PATENT DOCUMENTS

| | | | | |
|---|---|---|---|---|
| 8,006,300 | B2* | 8/2011 | Mizrah | H04L 63/08 726/20 |
| 2007/0294538 | A1* | 12/2007 | Lim | G06F 21/46 713/183 |
| 2009/0100265 | A1* | 4/2009 | Tadokoro | G07C 9/257 713/172 |
| 2012/0137352 | A1* | 5/2012 | Smales | G06F 21/31 726/7 |
| 2013/0198822 | A1* | 8/2013 | Hitchcock | G06F 21/00 726/6 |
| 2015/0089616 | A1* | 3/2015 | Brezinski | H04L 63/08 726/7 |
| 2015/0244706 | A1* | 8/2015 | Grajek | H04W 12/0609 726/6 |
| 2016/0352702 | A1* | 12/2016 | Gallant | H04L 63/123 |
| 2017/0329582 | A1* | 11/2017 | Steven | G06F 8/33 |
| 2018/0284957 | A1* | 10/2018 | Afsari | H04L 65/403 |
| 2019/0287200 | A1* | 9/2019 | Schuler | G06Q 50/265 |
| 2019/0306248 | A1* | 10/2019 | Swarangi | H04L 9/0861 |
| 2019/0311145 | A1* | 10/2019 | Baskaran | H04W 12/06 |
| 2020/0136831 | A1* | 4/2020 | Danielson | H04L 9/3247 |
| 2020/0136932 | A1* | 4/2020 | Jangam | H04L 9/0643 |
| 2020/0142884 | A1* | 5/2020 | Thapar | H04L 63/102 |
| 2020/0183883 | A1* | 6/2020 | Yang | H04L 9/0637 |

OTHER PUBLICATIONS

Prakash, et al. ; Eliminating Vulnerable Attacks Using One-Time Password and PassText—Analytical Study of Blended Schema ; Universal Journal of Computer Science and Engineering Technology 1 (2) ; pp. 133-140 ; Nov. 2010 ; 8 Pages.

Sneha, et al. ; Three Level Security System ; International Journal of Advanced Research in Computer Science and Applications 3 (5) ; May 2015 ; 7 Pages.

Yampolskiy ; Secure Network Authentication with PassText ; International Conference on Information Technology ; Center for Unified Biometrics and Sensors and IGERT in GIS University at Buffalo ; 2007 ; 6 Pages.

Bindu ; Secure Usable Authentication Using Strong Pass text Passwords ; I. J. Computer Network and Information Security vol. 3 ; pp. 57-64 ; 2015; 8 Pages.

* cited by examiner

FIG. 17 https://moodle/login moodle
LOGIN

USER NAME *:
MODIFY PASSTEXT *: — 1702
CHARACTER COUNT: 100

FORGET PASSTEXT — 1706

SAM MONTGOMERY LIVES IN THE SAN FERNANDO VALLEY AREA OF LOS ANGELES, WITH HER WIDOWED FATHER HAL, WHO RUNS A POPULAR SPORTS-THEMED DINER. FEELING SAM NEEDS A MOTHER, HAL MARRIES A VAIN AND SELFISH GOLD DIGGER NAMED FIONA, WHO HAS SOCIALLY-AWKWARD FRATERNAL TWIN DAUGHTERS, BRIANNA AND GABRIELLA, BELIEVING (WRONGLY) THAT FIONA WILL — 1704

*NOTE: THE MODIFIED PASSTEXT MUST BE AT LEAST 100 CHARACTERS LONG*

NEXT — 1708

STEP 1 OUT OF 2

METHODS, COMPUTER READABLE MEDIA, AND SYSTEMS FOR AUTHENTICATION USING A TEXT FILE AND A ONE-TIME PASSWORD

STATEMENT REGARDING PRIOR DISCLOSURES BY THE INVENTORS

Aspects of this technology were disclosed in Al-Sahwan, Ghadeer M.; Al-Ghussein, Ghena T.; Al Qasim, Maram I.; Alshehri, Nouf M.; and Alhawaj, Reem Z. A Strong and Practical Authentication Mechanism Using PassText and OTP. A project submitted in partial fulfillment of the requirements for the degree of Bachelor of Science in Cyber Security & Digital Forensic to Imam Abdulrahman Bin Faisal University, College of Computer Sciences & Information Technology, December, 2017, which is incorporated herein by reference in its entirety.

BACKGROUND

Technical Field

The present disclosure is directed generally to computer user authentication, and, more particularly, to methods, computer readable media, and systems for authentication using a text file and a one-time password.

Background

Security, convenience, and functionality are all motivating factors for having an efficient authentication process. However, there can be a tradeoff between these factors. When one increases, the others might decrease. For instance, there is an inverse relationship between security and convenience, and organizations tend to stand on a fine line between both.

Therefore, there may be an urgent need to find a balance between security and convenience, otherwise, the organization will fall onto either side (e.g., secure but inconvenient, or convenient but not secure). Unfortunately, convenience often prevails, which can result in sacrificing security. Using passwords as an authentication method, despite convenience, has security flaws. See Idrus, S. Z. S., Cherrier, E., Rosenberger, C., & Schwartzmann, J. J. (2013). A Review on Authentication Methods. Australian Journal of Basic and Applied Sciences, 7(5), 95-107, which is incorporated herein by reference. For instance, many users tend to set the same password for all their digital accounts.

As a result, if one account is compromised, the rest may be compromised too. Another problem is that users may prefer passwords that are easy to remember, which makes them vulnerable for different types of attacks including guessing, dictionary, and brute force. Even if we suppose that the user was careful enough to set a strong password, he might fall victim for a simple, yet smart, phishing attack.

Using a password alone may not be considered enough to protect the system, especially that new techniques and attacks to steal passwords every day. To overcome this issue, a second authentication factor is needed to enhance security. There are several popular authentication methods, in addition to passwords, such as biometrics, Near Field Communication (NFC), and tokens. However, although two factor authentication (2FA) can increase security levels drastically, it is important to take convenience into consideration.

The increasing number of attacks on passwords has led organizations to force strict policies on how a user sets his/her password in order to provide an appropriate level of security. On the other hand, those policies have raised the inconvenience issue for the user, especially where the user needs to access accounts frequently. Also, some login sessions are relatively short in some systems. Accordingly, a need may exist for a solution that integrates a stronger authentication mechanism with a reauthentication method to be implemented to balance between security and user convenience.

Some implementations of the present disclosure were conceived in light of the above mentioned problems and limitations of conventional programming techniques, methods and tools.

SUMMARY

Some implementations can include a method comprising receiving user credentials, and providing initial text for modification by a user associated with the user credentials. The method can also include receiving modified text, the modified text containing one or more modifications provided by the user and generating a first hash value based on a hash function of the initial text. The method can further include generating a second hash value based on a hash function of the modified text, and comparing the first hash value and the second hash value.

The method can also include, if the first hash value matches the second hash value, requesting the user to modify the initial text. The method can further include, if the first hash value does not match the second hash value, performing operations including: creating a record in a user table to store information corresponding to the user including the second hash value, wherein the information includes the modified text, and sending the user a first one-time password via email to verify that the user is an owner of an email address provided by the user.

The method can also include receiving a username and receiving modified text. The method can further include generating a third hash value based on a hash function of the modified text, and comparing the third hash value to the second hash value.

The method can further include, if the third hash value matches the second hash value, performing operations including: sending the user a second one-time password via email, receiving a password from the user, and, if the password received from the user matches the second one-time password sent via email, starting a session for the user.

The method can also include determining that a time duration for the session has expired, and reauthenticating the user by requesting modified text to be input again. The method can further include receiving newly input modified text, and generating a fourth hash value based on a hash function of the newly input modified text. The method can also include comparing the fourth hash value with the second hash value.

The method can further include, if the fourth hash value matches the second hash value, starting a new session for the user, and, if the fourth hash value does not match the second hash value, permitting the user to retry providing modified text a given number of times and repeating the generating and comparing on modified text received via retry attempts.

The method can also include detecting that a reset process is to be performed based on one of detecting a user request to perform a reset process or detecting user input indicating forgotten modified text. The method can further include, when the user request to perform a reset process is detected, performing operations including requesting modified text from the user, and receiving modified text from the user in response to the request to perform a reset process. The operations can also include generating a fifth hash value on the modified text received from the user in response to the request to perform a reset process, and comparing the fifth hash value to the second hash value. The operations can further include, if the fifth hash value matches the second hash value, providing a prompt for the user to enter new modified text, and if the fifth hash value does not match the second hash value, sending the user a one-time password via email to permit the user to enter new modified text when the one-time password is received, wherein a new hash value is generated from the new modified text and the new hash value is stored as the second hash value.

The method can also include, when user input indicating forgotten modified text is detected, performing operations including sending the user a one-time password via email to permit the user to enter new modified text when the one-time password is received, wherein a new hash value is generated from the new modified text and the new hash value is stored as the second hash value.

The method can further include detecting an indication that a user account has been compromised, and, in response to detecting that an indication that the user account has been compromised, sending the user a one-time password via email to permit the user to enter new modified text when the one-time password is received, wherein a new hash value is generated from the new modified text and the new hash value is stored as the second hash value. The credentials can include one or more of username, unique identifier, email address, or phone number. Modification of the initial text can include one or more of changing a portion of the initial text, adding to the initial text, or deleting a portion of the initial text.

Some implementations can include a non-transitory computer readable medium having instructions stored therein that, when executed by one or more processors, cause the one or more processors to perform a method. The method can include receiving user credentials, and providing initial text for modification by a user associated with the user credentials. The method can also include receiving modified text, the modified text containing one or more modifications provided by the user and generating a first hash value based on a hash function of the initial text. The method can further include generating a second hash value based on a hash function of the modified text, and comparing the first hash value and the second hash value.

The method can also include, if the first hash value matches the second hash value, requesting the user to modify the initial text. The method can further include, if the first hash value does not match the second hash value, performing operations including: creating a record in a user table to store information corresponding to the user including the second hash value, wherein the information includes the modified text, and sending the user a first one-time password via email to verify that the user is an owner of an email address provided by the user.

The method can also include receiving a username and receiving modified text. The method can further include generating a third hash value based on a hash function of the modified text, and comparing the third hash value to the second hash value.

The method can further include, if the third hash value matches the second hash value, performing operations including: sending the user a second one-time password via email, receiving a password from the user, and, if the password received from the user matches the second one-time password sent via email, starting a session for the user.

The method can also include determining that a time duration for the session has expired, and reauthenticating the user by requesting modified text to be input again. The method can further include receiving newly input modified text, and generating a fourth hash value based on a hash function of the newly input modified text. The method can also include comparing the fourth hash value with the second hash value.

The method can further include, if the fourth hash value matches the second hash value, starting a new session for the user, and, if the fourth hash value does not match the second hash value, permitting the user to retry providing modified text a given number of times and repeating the generating and comparing on modified text received via retry attempts.

The method can also include detecting that a reset process is to be performed based on one of detecting a user request to perform a reset process or detecting user input indicating forgotten modified text. The method can further include, when the user request to perform a reset process is detected, performing operations including requesting modified text from the user, and receiving modified text from the user in response to the request to perform a reset process. The operations can also include generating a fifth hash value on the modified text received from the user in response to the request to perform a reset process, and comparing the fifth hash value to the second hash value. The operations can further include, if the fifth hash value matches the second hash value, providing a prompt for the user to enter new modified text, and if the fifth hash value does not match the second hash value, sending the user a one-time password via email to permit the user to enter new modified text when the one-time password is received, wherein a new hash value is generated from the new modified text and the new hash value is stored as the second hash value.

The method can also include, when user input indicating forgotten modified text is detected, performing operations including sending the user a one-time password via email to permit the user to enter new modified text when the one-time password is received, wherein a new hash value is generated from the new modified text and the new hash value is stored as the second hash value.

The method can further include detecting an indication that a user account has been compromised, and, in response to detecting that an indication that the user account has been compromised, sending the user a one-time password via email to permit the user to enter new modified text when the one-time password is received, wherein a new hash value is generated from the new modified text and the new hash value is stored as the second hash value. The credentials can include one or more of username, unique identifier, email address, or phone number. Modification of the initial text can include one or more of changing a portion of the initial text, adding to the initial text, or deleting a portion of the initial text.

Some implementations can include a system comprising one or more processors coupled to a non-transitory computer readable medium having stored thereon software instructions that, when executed by the one or more processors, cause the one or more processors to perform operations. The operations can include receiving user credentials, and providing initial text for modification by a user associated with the user credentials. The operations can also include receiving modified text, the modified text containing one or more modifications provided by the user, and generating a first hash value based on a hash function of the initial text. The operations can further include generating a second hash value based on a hash function of the modified text, and comparing the first hash value and the second hash value. The operations can also include, if the first hash value matches the second hash value, requesting the user to modify the initial text, and, if the first hash value does not match the second hash value, performing operations including creating a record in a user table to store information corresponding to the user including the second hash value, wherein the information includes the modified text, and sending the user a first one-time password via email to verify that the user is an owner of an email address provided by the user.

The operations can further include receiving a username, and receiving modified text. The operations can also include generating a third hash value based on a hash function of the modified text, and comparing the third hash value to the second hash value. The operations can further include, if the third hash value matches the second hash value, performing operations including sending the user a second one-time password via email, receiving a password from the user, and, if the password received from the user matches the second one-time password sent via email, starting a session for the user.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 17 is a diagram of an example login interface for a first authentication factor in accordance with some implementations.

DETAILED DESCRIPTION

Figure 1:
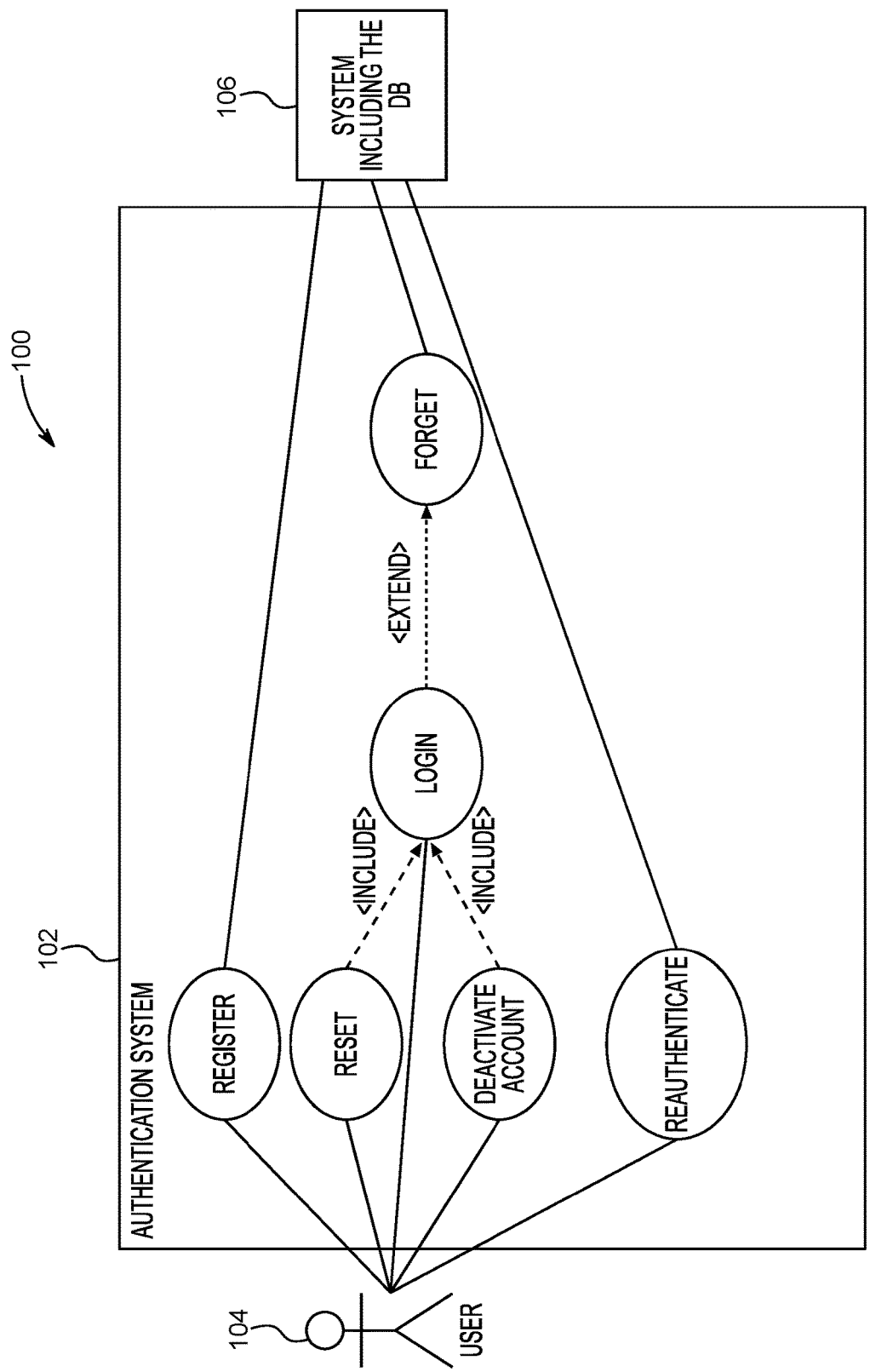
FIG. 1 is a diagram of an example operating environment and use case for an authentication system using a text file and a one-time password in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to methods, systems, and computer readable media for strong authentication with the consideration of practical reauthentication. For example, a user may use two authentication factors only the first time he logs in. After that, for a specified amount of time, the user may only need to use one authentication factor. This functionality can be provided by a balanced combination of two methods which together provide a combination of security and convenience.

With the rapid development of technology, a simple password authentication mechanism may not be enough to provide complete security for a system, even when password policies are enforced to increase security levels. Not forgetting to mention that those policies contribute to decreasing the user's convenience level and usability. Therefore, this project aims to implement a strong authentication mechanism with a practical reauthentication technique that answers the research question "how to increase the security of the authentication mechanism without sacrificing convenience?" The proposed solution is a combination of a text file that the user has to modify (PassText), which is a new authentication method disclosed herein, and a one-time password (OTP). The disclosed subject matter includes a technical solution to the problems mentioned herein, which provides improved user convenience, computer system security, implementation cost and authentication speed.

Authentication "is a process of ensuring the identity (username, PIN code etc.) of an entity, person or process to which it was issued." (See, Shah, S. U., & Minhas, A. A. (2009, April). New factor of authentication: Something you process. In *Future Computer and Communication, 2009. ICFCC 2009. International Conference on* (pp. 102-106). IEEE, which is incorporated herein by reference). Authentication depends on the information provided by the user, and can include something you know, something you are or something you own, or a combination of those.

Authentication factors can include password, fingerprint, voice recognition, near field communication, and/or and token. The factors can be classified according to the information provided: something you know, something you are or something you own.

Within the something you know classification, the password is considered one of the oldest and dominant authentication method in digital authentication. Systems based on password authentication method authenticate users based on requesting a user ID and password and only if these were provided and perfectly matched the stored ones in the system database, will the user be authenticated. The simplicity of using the password made it an inexpensive authentication option as there is no need to provide the users with additional hardware or software. Furthermore, the speed of the password authentication process depends on the password length and the strength of the encryption algorithm used to protect the confidentiality of the process but mostly it is performed at high speed. Thus, using a password is the authentication standard for most systems to date. (See, Arai, M. (2015, January). Development and Evaluation of Secure Socket Layer Visualization Tool with Packet Capturing Function. In *MATEC Web of Conferences* (Vol. 28). EDP Sciences, which is incorporated herein by reference).

However, the increasing threat of cyber-attacks made passwords vulnerable to different types of attacks that target password storage, password transmission or password essence. For that, several protection measures were used to overcome password vulnerability. One of the measures is using the most secure current hash functions to prevent collision attack as the previously used functions such as MD5 and SHA-1 are not secure against this attack. (See, Kim, D. C., Hong, D., Lee, J. K., Kim, W. H., & Kwon, D. (2014, December). LSH: A new fast secure hash function family. In *International Conference on Information Security and Cryptology* (pp. 286-313). Springer, Cham., which is incorporated herein by reference). Another measure is using a Secure Sockets Layer (SSL) certificate to ensure confidentiality and integrity of password against Man in the Middle attack. (See, Arai, M. (2015, January). Development and Evaluation of Secure Socket Layer Visualization Tool with Packet Capturing Function. In *MATEC Web of Conferences* (Vol. 28). EDP Sciences, which is incorporated herein by reference). Also, enforcing a password policy that requires the users to apply different rules that decrease the possibility of a successful dictionary and brute force attacks, these rules include the type of characters, password length, no reusing the password and password expiration period. However, not all users can cope with these strict rules, so they may try to increase the convenience by writing down their passwords or reuse the same password after its expiration or use the same password for multiple systems. All the above make the password policy insufficient for password protection especially considering that these policies will keep getting stricter to cope up with the increased security threats. (See, Gaw, S., & Felten, E. W. (2006, July). Password management strategies for online accounts. In *Proceedings of the second symposium on Usable privacy and security* (pp. 44-55). ACM, which is incorporated herein by reference).

Accordingly, password authentication needs to persistently evolve its protection to be immune against cyber threats. Also, it needs to be more convenient to users without compromising security.

One of the attempts to increase user convenience is honey encryption (HE). (See, Juels, A., & Ristenpart, T. (2014, May). Honey encryption: Security beyond the brute-force bound. In Annual International Conference on the Theory and Applications of Cryptographic Techniques (pp. 293-310). Springer, Berlin, Heidelberg which is incorporated herein by reference). HE generates a ciphertext able to become a valid-looking plaintext when decrypted with any incorrect key this plaintext is called honey messages. The HE basically depends on two things a scheme called a distribution-transforming encoder (DTE) that provides encrypted random messages, and a mechanism to predicate the maximum loading of different kinds of honey messages based on a concept called balls-and-bins games. By using HE, the attackers will not be able to find the correct plaintext as every key they try will produce a different plausible result, which overcomes an offline Brute-Force attack.

Moreover, the HE is only applicable in the cases where the original message is considered small and vulnerable to the Brute-Force attack like in case of credit card number, RSA secret keys, or user-chosen password, for this the HE can be used to increase users' convenience and will as well protect user-chosen password no matter how weak it is.

However, the HE has several limitations as it is inefficient in cases the attacker has some knowledge related to the key, such as knowing the associated public key. For that, it is not secure to use HE to protect certificate keys. Also, the attackers may become able to detect the correct plaintext if two related messages were encrypted using the same key. However, there is no concern if the messages were unrelated. (See, Juels, A., & Ristenpart, T. (2014, May). Honey encryption: Security beyond the brute-force bound. In *Annual International Conference on the Theory and Applications of Cryptographic Techniques* (pp. 293-310). Springer, Berlin, Heidelberg, which is incorporated herein by reference).

Biometric is an ancient Greek term that consists of two parts, bio that means "life" and metric that means "measurements". Biometrics refers to the study and utilization of unique physiological and behavioral characteristics of individuals. See, Saini, R., & Rana, N. (2014). Comparison of various biometric methods. International Journal of Advances in Science and Technology (IJAST) Vol, 2; Bhattacharyya, D., Ranjan, R., Alisherov, F., & Choi, M. (2009). Biometric authentication: A review. International Journal of u- and e-Service, Science and Technology, 2(3), 13-28; and Soyuj Kumar Sahoo, Tarun Choubisa & S. R. Mahadeva Prasanna (2012) Multimodal Biometric Person Authentication: A Review, IETE Technical Review, 29:1, 54-75, which are incorporated herein by reference.

Biometrics can be classified into two classes physical and behavioral. The first class refers to the stable trait of the human such as face, fingerprint and iris. Handwritten signature, keyboard typing and voice are examples considered under the behavioral class. However, voice recognition is sometimes classified under the physical class because it is based on physical features such as the lunges and the vocal cords. (See, Arai, M. (2015, January). Development and Evaluation of Secure Socket Layer Visualization Tool with Packet Capturing Function. In *MATEC Web of Conferences* (Vol. 28). EDP Sciences, which is incorporated herein by reference).

Fingerprints are formed from the unique characteristics of ridges and valleys on the surface of human fingers. Fingerprint technology dominates the biometric market and accounts for 52% of authentication systems that are based on biometric traits. (See, Sarat C Dass & Anil K Jain (2007) Fingerprint-Based Recognition, *Technometrics*, 49:3, 262-276, which is incorporated herein by reference).

Using a fingerprint to authenticate the user is considered convenient since the user does not have to memorize or to carry anything in order to be authenticated. To speed the authentication process up, the authentication system stores unique characteristics of the fingerprint in a small size template, only the extracted features from the user fingerprint will be compared to the features existing in the user template. (See, Arai, M. (2015, January). Development and Evaluation of Secure Socket Layer Visualization Tool with Packet Capturing Function. In *MATEC Web of Conferences* (Vol. 28). EDP Sciences, which is incorporated herein by reference).

The accuracy of the fingerprint and the biometrics authentication in general are measured by the false rejection rate (FRR) and the false acceptance rate (FAR). The FRR refers to when a system incorrectly rejects a legitimate user. On the other hand, FAR measurement refers to when the system determines an intruder to be an authenticated user. For both measurements, fingerprint technology has a 2% false result rate. (See, Bhattacharyya, D., Ranjan, R., Alisherov, F., & Choi, M. (2009). Biometric authentication: A review. *International Journal of u-and e-Service, Science and Technology*, 2(3), 13-28, which is incorporated herein by reference).

With the current computer-driven era, the cost of implementing a fingerprint authentication method has been dramatically decreased as scanners are becoming cheaper with more organizations adopting the technology. Fingerprint authentication method provides a level of security assurance since it is resilient to brute guessing but still not eliminating the possibility of the authentication factor being stolen, this is one of the biggest disadvantages of a biometric identity, if the identity has been stolen recovering it or resetting the authentication factor may become difficult or impossible. (See, Saini, R., & Rana, N. (2014). Comparison of various biometric methods. *International Journal of Advances in Science and Technology* (IJAST) Vol, 2, which is incorporated herein by reference).

Wei, Cong and Zhiwei proposed a framework for adopting fingerprint authentication mechanism for online examinational systems. (See, L. Wei, Z. Cong and Y. Zhiwei. (2010). "Fingerprint Based Identity Authentication for Online Examination System". *Second International Workshop on Education Technology and Computer Science*, Wuhan. pp. 307-310, which is incorporated herein by reference). The proposed framework uses the traditional minutiae matching algorithm to authenticate the users since this algorithm is considered efficient, time saving and having low FAR and FRR. The framework also utilizes 3DES to encrypt the extracted template. The overall result of the framework implementation shows the feasibility of the approach even though enhancing the performance of the fingerprint identification is an issue that has to be addressed in the future.

The human voice can be used to identify the identity of the user. Voice recognition is the process of using the unique characteristics of the human voice for authentication purposes. It is considered behavioral characteristics for authentication. Each person has different vocal characteristics such as cadence, nasal cavities, and frequency. The goal of voice recognition is to analyze, recognize and extract the vocal uniqueness then process the signals to identify different information about the user identity. Voice recognition utilizes three types of spoken input which are text dependent, text independent and text prompted. (See, Vats, S., & Kaur, H. (2016). A comparative study of different biometric features. *International Journal of Advanced Research in Computer Science*, 7(6); and Bhattacharyya, D., Ranjan, R., Alisherov, F., & Choi, M. (2009). Biometric authentication: A review. *International Journal of u-and e-Service, Science and Technology*, 2(3), 13-28, which are incorporated herein by reference).

Vocal characteristics are not permanent. There are several things can affect the accuracy rate and performance of voice recognition such as voice changing because of background noise, illness, and aging. The error rate of voice recognition can be measured by the false rejection rate (FRR) and the false acceptance rate (FAR). After measuring, voice recognition has 2% for FAR and 10% for FRR. (See, Bhattacharyya, D., Ranjan, R., Alisherov, F., & Choi, M. (2009). Biometric authentication: A review. *International Journal of u-and e-Service, Science and Technology*, 2(3), 13-28, which is incorporated herein by reference).

Voice recognition is considered a convenient authentication method since the user does not have to memorize a sequence of numbers and letters. A number of voice recognition methods provide a random code or word for the user to pronounce which provides more authentication security. However, a number of recognition methods force the speaker to put the stress on every vowel sound or require the user to utter the same word repeatedly, which may be considered inconvenient for the user. (See, Savchenko, A. V., & Savchenko, L. V. (2015). Towards the creation of reliable voice control system based on a fuzzy approach. *Pattern Recognition Letters*, 65, 145-151, which is incorporated herein by reference).

The greatest advantage of voice recognition is the low cost. Voice recognition does not require any unique and expensive device that costs a large amount of money. The voice recognition technique only needs a microphone and voice recording software which is pre-installed on most devices. (See, Bhattacharyya, D., Ranjan, R., Alisherov, F., & Choi, M. (2009). Biometric authentication: A review. *International Journal of u-and e-Service, Science and Technology*, 2(3), 13-28, which is incorporated herein by reference).

The human voice is not a secret, and its availability does not affect the security. Intruders cannot steal vocal characteristics of other people the same way they steal cards or passwords. However, voice recognition depends on the security of the system and network. Vocal characteristics can be stolen when an intruder hacks the system. (See, Matyáš, V., & Říha, Z. (2002). Biometric authentication—security and usability. In *Advanced Communications and Multimedia Security* (pp. 227-239). Springer US., which is incorporated herein by reference).

In recent years, several papers have proposed methods to increase security, accuracy, and usability of voice recognition. Yan and Zhao present a usable voice authentication system based on personal voice challenge without any manual inputs. The goal of this paper is to enhance the usability of voice authentication and overcome the weaknesses of previous authentication methods. (See, Yan, Z., & Zhao, S. (2016). A usable authentication system based on personal voice challenge. 194-199, which is incorporated herein by reference). This method used speech recognition and speech synthesis to complete authentication process. The proposed method has two stages. The first stage is to extract the user voice characteristics based on system prompts such as reading codes to create user profile. The second stage is providing the authentication passes if the comparison between user response challenge and the prestored voice in the system.

Gałka and Masior present the concept of the embedded solution for voice access system. (See, Gałka, J., Masior, M., & Salasa, M. (2014). Voice authentication embedded solution for secured access control. *IEEE Transactions on Consumer Electronics*, 60(4), 653-661, which is incorporated herein by reference).

Some implementations can include an access control module that process all data sent to the system. The identification and authentication process include the comparison of the ID number and the prestored key in the system. Then, the system asks the user to utter the preselected phrase to extract the voice feature and compare it with the stored voice to complete the two-way authentication.

The something you own category includes Near Field Communication or NFC is a wireless short-range transmission method that has been recently implemented in most of modern smartphones using NFC chips. Such technology has opened the door to a number of applications ranging from contactless payment to data transfer between two devices. What makes this technology so popular is that it is invincible to eavesdroppers due to its very short range, which does not exceed 20 cm. (See, Coskun, V. (2013). A Survey on Near Field Communication (NFC) Technology. *Wireless Pers Commun*, 2259-2294, which is incorporated herein by reference). In [19] NFC's three operating modes are discussed. These three modes are reader/writer mode, peer-to-peer mode, and card emulation mode, which is the main focus of modern authentication schemes. NFC is considered to be convenient to users, since all a user has to do is scan his card to authenticate. Furthermore, it eliminates the need to remember any passwords, which makes the authentication process faster. Another good quality about NFC is its low error rate, which makes it a reliable authentication method. (See, Rahul, A., Krishnan, G. G., Krishnan, U. H., & Rao, S. (2015). NEAR FIELD COMMUNICATION (NFC) TECHNOLOGY: A SURVEY. *International Journal on Cybernetics & Informatics (IJCI)*, 133-144, which is incorporated herein by reference).

When it comes to security, NFC is not invincible to man in the middle attack, despite the use of a Secure Element (SE), which is an electronic circuit that provides some of the most essential security mechanisms, including digital signatures, encryption and secure storage. Furthermore, unlike passwords, guessing attack cannot be applied to NFC communications. (See, Ali, A. H., Reham Abdellatif Abouhogail, I. F., & Youssef, M. I. Security Analysis of NFC Technology Compared with other Mobile Wireless Technologies, which is incorporated herein by reference).

Unfortunately, SE does not provide enough security, especially when relay attack is involved. For example, in a scenario where a customer tries to pay using his phone the attacker might be able to hijack his data by stealing the point of sale terminal signals. (See, Alexiou, N., Basagiannis, S., & Petridou, S. (2016). Formal security analysis of near field communication using model checking. *Computers & Security*, 60, 1-14, which is incorporated herein by reference).

A token is a hardware device or a software installed in a multipurpose-device, that is used for the authentication process. There are multiple types of token devices, they might be secure devices that store passwords like remote garage door opener, or active devices that generate a one-time password (OTP), using either time-synchronous mode or challenge-response mode. (See, Arai, M. (2015, January). Development and Evaluation of Secure Socket Layer Visualization Tool with Packet Capturing Function. In *MATEC Web of Conferences* (Vol. 28). EDP Sciences, which is incorporated herein by reference).

Focusing on the hardware tokens, they are usually small handheld devices that are accessed by the client side to generate a passcode, which is then transmitted to the host for authentication. The hardware token family has a large number of implemented applications such as RSA, SecurID, PICO, and YubiKey.

YubiKey is a hardware token shaped as USB flash drive, that is manufactured by the Swedish company Yobico. When it is plugged into the USB port of the computer, it identifies itself as a USB keyboard, so it can emulate the OTP or the challenge to the host. YubiKey operates on four various modes depending on its configuration. The four modes are: YubiKey OTP, OATHHOTP (OTP is yield based on the standard RFC 4226 HOTP algorithm), challenge-response mode (API is used to retrieve the OTP rather than keyboard emulation) and static mode (static password instead of OTP). (See, Künnemann, R., & Steel, G. (2012, September). YubiSecure? Formal security analysis results for the YubiKey and YubiHSM. In *International Workshop on Security and Trust Management* (pp. 257-272). Springer, Berlin, Heidelberg; and Lee, H., Hong, W. C., Kao, C. H., & Cheng, C. M. (2014). A User-friendly Authentication Solution using NFC Card Emulation on Android. 2014 *IEEE 7th International Conference on Service-Oriented Computing and Applications*, 271-278, which are incorporated herein by reference).

The most common and typical mode configuration is YubiKey OTP. Basically, the device contains a touch button for OTP generation, when it is pressed, a byte string will be generated based on several values, including embedded unique secret ID, counter, timer and a random number. After that, the byte string will be encrypted using 128-bit AES key stored in the YubiKey and transmitted as keystrokes through the keyboard. For the authentication in the server or the host application, the received value is decrypted using the same 128-bit AES key and checked against multiple factors to decide whether to accept or reject the OTP. (See, Künnemann, R., & Steel, G. (2012, September). YubiSecure? Formal security analysis results for the YubiKey and YubiHSM. In *International Workshop on Security and Trust Management* (pp. 257-272). Springer, Berlin, Heidelberg; and Yubico, A. B. (2015). Kungsgatan 37, 111 56 Stockholm Sweden. The YubiKey Manual-Usage, configuration and introduction of basic concepts (Version 3.4), which are incorporated herein by reference).

Notably, YubiKey is designed to be used only with another authentication method in order to prevent the unauthorized usage in case if it was lost or stolen. Also, it applies different security measures to prevent several attacks such as replay attack. During the authentication process the server or host compares the new received counter with the previous one if it is less or equal then it is a replay attack and the OTP would be rejected. (See, Yubico, A. B. (2015). Kungsgatan 37, 111 56 Stockholm Sweden. The YubiKey Manual-Usage, configuration and introduction of basic concepts (Version 3.4), which is incorporated herein by reference).

For the user's convenience, Yobico has integrated NFC technology to its new versions of YubiKey devices. Which means YubiKey now can be used on smartphones. This version uses USB 2.0 full-speed. Also, it is worth to mention that the average cost of a YubiKey is around $25. And it has been integrated with many online systems and services as a second factor of authentication for systems such as Google, Facebook, Dropbox, etc. Most importantly, Yobico offers a free open source server to anyone wants to integrate YubiKey functionality to an existing website or service. (See, Yubico, A. B. (2015). Kungsgatan 37, 111 56 Stockholm Sweden. The YubiKey Manual-Usage, configuration and introduction of basic concepts (Version 3.4), which is incorporated herein by reference).

As any other technology, YubiKey has advantages and disadvantages. One of the disadvantages may be that it only works with the Google Chrome browser. Another disadvantage may be that if it is plugged in to a device and the user, for example, is opening a chatting program and touches the YubiKey mistakenly, his current OTP might be sent. Also, it has a number of security flaws in the open source server, that if the server is compromised all stored keys may be accessible.

A comparison is shown in Table 1 below based on four different solution factors:

1) Convenience: e.g., user's comfort and effort excreted in terms of memorizing or carrying objects (See, Takahashi, T., & Nogami, H. (2001). U.S. Pat. No. 6,332,025. Washington, D.C.: U.S. Patent and Trademark Office, which is incorporated herein by reference);

2) Security: e.g., how secure the system based on five security measurements: resilience to physical observation, resilience to guessing, compromise detection, recovery from loss and resilience to replay attack;

3) Cost: e.g., financial cost of implementing the authentication system;

4) Speed: e.g., how fast is the authentication session from the starting point to the ending point. (See, De Luca, A., Hertzschuch, K., & Hussmann, H. (2010, April). ColorPIN: securing PIN entry through indirect input. In *Proceedings of the SIGCHI Conference on Human Factors in Computing Systems* (pp. 1103-1106). ACM., which is incorporated herein by reference).

The following subsections illustrate the results shown below in Table 1.

1) Convenience

In the solution requirements analysis below, techniques are compared using two sub criteria: the memorywise-effort and the need to carry an external device. The result shows that the other techniques scored better than the password regarding the memorizing factor. In contrast for the need to carry an external device, both types of biometrics are as the password offering the convenience for the user to not carry anything, while the NFC and Yubikey token offer less convenience than the password for this factor.

2) Security

The comparison of the authentication techniques security focuses on four security measures:

First: Resilience to Physical Observation

Physical observation here means that the authenticator can be stolen only from the observation, shoulder surfing attack is one example. What we can notice is that NFC, Yubikey and fingerprint are immune to these types of attacks. However, the voice recognition is vulnerable to them, because the voice can be recorded and then used to be authenticated.

Second: Resilience to Guessing

Often, guessing attacks are more successful than one would think. Due to the shortage of the human memory, some people might tend to choose passwords that are easy to remember, but on the other hand, easy to guess by the attackers. Nowadays, due to the increase of computing power and the availability of different dictionaries, the vulnerability for guessing attacks has increased too. Unlike the password, techniques such as NFC, YubiKey, fingerprint and voice recognition do not give the attacker the chance to try any predictable credentials.

Third: Compromise Detection

It is important to deepen the defense line to exceed the front-line attacks, therefore, compromise detection is essential to "determine if an authenticator has been stolen or otherwise compromised, preferably before it is used illicitly". For passwords and biometrics, the detection techniques are weak comparing to the detection methods of the NFC devices and Yubikey token. In the last two, the physical observation of the device's loss is deemed as a physical evidence. In contrast, in case of the compromising of passwords and biometrics the user will not notice that, unless an authentication log is monitored and the user remembers when the last authentication activity occurred. Keeping in mind, that recently thefts of the token number have happened in this case the compromise is not detected, however, its effect will not last long because it is OTP, only viable for a session.

Fourth: Recovery from Loss

As there are detection techniques so too are there recovery techniques. The comparison here is different, the password has the best recovery methods among all the techniques. When a compromising is detected all what the user has to do is to change his password. Then come the NFC and Token recovery, in case of loss the user has to deactivate or deregister them from the system, but the same physical device will not be viable anymore. The weakest recovery methods are for the biometrics, if the used algorithm does not employ the challenge-response concept and it only relays on the static biometric the compromise is deemed destroyable, because once user's biometric measures are exposed they cannot be recovered again.

3) Cost

The result is that the password costs less than all other authentication techniques. The other authentication techniques require special hardware or software to be implemented, deployed and maintained; therefore, they cost more than passwords.

4) Speed

The biometric techniques have similar processing speed level as password techniques. While NFC and the Token YubiKey may have the highest speed among those techniques, because of the small size of their used code or signature that can be processed in short time.

TABLE 1

Comparison Between Existing Authentication Techniques

| | | | Convenience | | Security | | | | | |
|---|---|---|---|---|---|---|---|---|---|---|
| | | | | | Nothing to carry | Resilient-to- | | | | |
| | | References | Memorywise-effort | | | Physical Observation | Resilient-to-Guessing attack | Compromise Detection | Recovery from Loss | Cost | Speed |
| Techniques | NFC | [20] [21] [22] | ● | ○ | ● | ● | ● | ○ | ○ | ● |
| | Token (YubiKey) | [24] [23] | ● | ○ | ● | ● | ● | ○ | ○ | ● |
| | Fingerprint | [27] [8] | ● | = | ● | ● | = | ○ | ○ | = |
| | Voice Recognition | [9] [14] [15] | ● | = | | ● | = | ○ | ○ | = |

'●' offers a benefit over the password method;
'○' the performance is worse than the password;
'=' offers the same benefits as the password.

A number of implemented or proposed 2FA mechanisms in different fields are listed in Table 2 along with a summary of the advantages and disadvantages for each technique.

For example, Cherdmuangpak, Anusas-amonkul and Limthanmaphon proposed a 2FA technique to authenticate junior high school students in Pakthongchaiprachaniramit School in Thailand. (See, N. Cherdmuangpak, T. Anusas-amonkul and B. Limthanmaphon. (2017). "Two factor image based password authentication for junior high school students". *International Joint Conference on Computer Science and Software Engineering (JCSSE)*, Nakhon Si Thammarat, pp. 1-6, which is incorporated herein by reference). The school educational system authentication method is inconvenient, it is a 13-digit alphanumeric password, the proposed solution aimed to replace it with an image-based password authentication method with conjunction with three questions. The user has to register by selecting an image out of 100 images or uploading a preferable image. The second factor of authentication is to click on five points on the selected image. When the user wants to login, the system displays the images and asks the user to select the correct image as well as clicking on three points out of the selected five in the registration stage. The test of the proposed solution shows that the new technique needs more time than alphanumeric passwords during both the registration and the login process. However, this solution has higher accuracy, the percentage of successful login attempts was higher than the alphanumeric password. The this solution has a security flow; the 100 images are not enough to prevent guessing attacks.

Another contribution in the educational field was conducted by Tellini and Vargas, they attempted to implement a 2FA mechanism in DigiExam digital assessment platform. (See, Tellini, N., & Vargas, F. (2017). Two-Factor Authentication: Selecting and implementing a two-factor authentication method for a digital assessment platform, which is incorporated herein by reference). The password was used as the first factor and OTP as a second factor. The user has the choice to either receive the OTP using SMS or through FreeOTP application installed in the mobile phone device. FreeOTP application is a free application available for both Android and iOS devices. They based their assessment on four criteria cost, deployability, user experience and security. Their solution performed well in both deployability and cost since no extra hardware is needed besides the user mobiles. Account recovery was one of the solution limitations. So, their solution might not be optimal when considering the user experience.

In the governmental field, the ministry of interior in the Kingdom of Saudi Arabia deployed a web based application named "Absher" with 2FA mechanism. (See, User Registration. (n.d.). Retrieved Nov. 3, 2017, from https://www.moi.gov.sa/wps/portal/static/register/, which is incorporated herein by reference). A password and the second factor is an OTP using SMS. The passwords are regulated with a strong policy. The policy states that the password should: consist of at least 8 characters, include a combination of numbers, lowercases and uppercase characters, do not include the user ID and do not contain repeated characters more than half the length of the password. This conventional implementation offers a great level of security; however, the use of strong password policy is still not sufficiently convenient.

Majumder et al. introduced a card-free payment authentication scheme named "Pay-Cloak". (See, Majumder, A., Goswami, J., Ghosh, S., Shrivastawa, R., Mohanty, S. P., & Bhattacharyya, B. K. Pay-Cloak: A Biometric Back Cover for Smartphone with Tokenization Principle for Cashless Payment, which is incorporated herein by reference). This scheme consists of a hardware module, which is the phone's back cover in this case, and a mobile phone application that communicates with the module via Bluetooth only after the fingerprint scanner authenticates the customer. Furthermore, Pay-Cloak scheme is secured using a security mechanism named tokenization. Tokenization is a process where the user's credit card critical information, such as number and expiration date, are stored in a secure server, better known as 'vault'. After the credit card information is presented to the server, it generates a random token and sends it back to the user, so he can use it for the authentication process. This scheme takes an advantage of QR code's flexibility and ease of use.

This payment process consists of four main components, namely, the merchant, the customer, processing cloud server, and the main server. In the registration process, the merchant provides his information to the cloud server, in exchange, he will be granted a Merchant Payment ID (MPI). On the other hand, when the customer registers using the phone application, he will be asked to enter his bank credentials. After that, the cloud server will communicate with the bank server to send an OTP to the customer. If the customer verifies his identity correctly, the bank will generate a token and store it in its database. After that, the token will be sent to the cloud server and then passed to the customer's phone. Finally, the token will be stored securely and locally on the customer's phone using SQLite DB. After finishing the registration process successfully, the customer will be granted a Client Payment ID (CPI). Now the Merchant is able to create a QR code that contains essential data such as his MPI and the product's price.

Whenever the customer scans the QR code, the phone application will force him to authenticate his fingerprint. After authenticating successfully, CPI, token, and MPI are sent to the cloud server, which in turn sends the token to the client's bank server for verification. If the verification is done successfully, the money will be transferred from the customer's account to the merchant's account and a new token will be generated.

Rahul et al. have proposed a new authentication method that uses NFC combined with digital signature to provide a balanced combination of security and convenience. (See, Rahul, A., Krishnan, G. G., Krishnan, U. H., & Rao, S. (2015). NEAR FIELD COMMUNICATION (NFC) TECHNOLOGY: A SURVEY. *International Journal on Cybernetics & Informatics (IJCI)*, 133-144, which is incorporated herein by reference). The NFC authentication scheme consists of three phases, namely, registration, login, and verification.

First, in the registration phase, the mobile device sends the public key and the user's identifier (UUID) to the server in order to store them in the database. On the other hand, the private key and the server's information will be stored on the mobile device. Next, in login phase, the user sends a request to the server. As a result, the server responds with a nonce, which is basically a random combination of bits. After that, the NFC reader starts scanning, waiting for the user to swipe his mobile device on the reader. However, it is noteworthy that the user has to enter his pin before the scanning, this step can increase security in case the device was stolen. After the reader scans the device successfully, it passes the nonce sent previously by the server to the device. The device signs the nonce with its private key, adds the UUID, and sends the packet back to the server. Finally, in the verification phase, the server retrieves the public key related to the received UUID and verifies the signature.

In this scheme, all transactions are expected to use TLS or SSL in order to secure the channels. The only component that might be attacked is the database. However, even if that happens, the attack will be useless since all what the attacker can get is UUID and the public key. Assume that the attacker has managed to get a grasp on the user's password somehow. In case that happens, he will only be able to use it only once since the server sends a different nonce at every login.

When it comes to usability, this scheme is always a winner. Simply, all what the user has to do is remember one password and swipe his device. On the other hand, the password scheme requires remembering a different password for each account in addition to entering the username. One more good quality about NFC scheme is the low error rate, which makes it reliable. Furthermore, this authentication is considered fast since the signature is relatively small and does not take that much time to process. Furthermore, NFC is cost effective since it is already implemented in most modern devices.

A methodology that uses two authentication factors, alphanumerical password and graphical password is proposed by Vaithyasubramanian et al. (See, Vaithyasubramanian, S., Christy, A., & Saravanan, D. (2015). 2FAS FOR SECURED LOGIN IN SUPPORT OF EFFECTIVE INFORMATION PRESERVATION AND NETWORK SECURITY. *ARPN Journal of Engineering and Applied Sciences*, 2053-2055, which is incorporated herein by reference). First of all, the user needs to pass the first authentication gate by entering the correct alphanumerical password. If he succeeds, he will be asked to pass the second authentication gate by entering the graphical password or set of images that he sat before. Although this approach enhances security by adding a second layer of defense, it requires the user to remember two passwords instead of one. Furthermore, it consumes more time to apply and process.

Below are some advantages and disadvantages of the combination of authentication factors of each conventional solution are compared. It is noteworthy that conventional techniques provide a convenient reauthentication mechanism. Table 2, below, illustrates the comparison.

TABLE 2

|   | Reference | First Factor | Second Factor | Advantages | Disadvantages |
|---|---|---|---|---|---|
| 1 | [1] | Selecting image | Clicking three points on the image | Easy to deploy Low cost Easy to remember | Not providing strong security Low speed |
| 2 | [2] | Password | OTP using SMS | Strong security | SMS cost Depend on the phone service availability |
| 3 | [3] | Password | OTP using mobile application | Easy to deploy | Lower cost than using SMS Depend on the phone device availability |
| 4 | [4] | Stored token | Fingerprint | Tokens and tokenization can protect the user's information from different security threats Fingerprint authentication | Registration process is long and time consuming Might cause issues in case the phone was stolen or lost |

TABLE 2-continued

| Reference | First Factor | Second Factor | Advantages | Disadvantages |
|---|---|---|---|---|
| | | | increases the security levels since fingerprints are hard to fake or steal Eliminates the need to carry credit cards | |
| 5 | [5] | NFC | Password | Enhances security If the attacker gets the victim's password, it can be used once If the attacker gets the victim's device, he can't scan without the password Fast Convenient One pin code for all the user's accounts No need to remember passwords Low error rate Cost effective | In case the device was broken or lost, it will be hard to access the account The user needs to have the device with him all the time |
| 6 | [6] | Alphanumerical Password | Graphical Password | Defense in depth Low cost Easy to implement and deploy Increases security by adding a second layer of authentication | Time consuming Decreases convenience since the user needs to remember two things instead of one Storage consuming |

[1] N. Cherdmuangpak, T. Anusas-amonkul and B. Limthanmaphon. (2017). "Two factor imagebased password authentication for junior high school students". *International Joint Conference on Computer Science and Software Engineering (JCSSE)*, Nakhon Si Thammarat, pp. 1-6.
[2] Tellini, N., & Vargas, F. (2017). Two-Factor Authentication: Selecting and implementing a two-factor authentication method for a digital assessment platform.
[3] User Registration. (n.d.). Retrieved Nov. 3, 2017, from https://www.moi.gov.sa/wps/portal/static/register/.
[4] Majumder, A., Goswami, J., Ghosh, S., Shrivastawa, R., Mohanty, S. P., & Bhattacharyya, B. K. Pay-Cloak: A Biometric Back Cover for Smartphone with Tokenization Principle for Cashless Payment.
[5] Rahul, A., Krishnan, G. G., Krishnan, U. H., & Rao, S. (2015). NEAR FIELD COMMUNICATION (NFC) TECHNOLOGY: A SURVEY. International Journal on Cybernetics & Informatics (IJCI), 133-144.
[6] Vaithyasubramanian, S., Christy, A., & Saravanan, D. (2015). 2FAS FOR SECURED LOGIN IN SUPPORT OF EFFECTIVE INFORMATION PRESERVATION AND NETWORK SECURITY. ARPN Journal of Engineering and Applied Sciences, 2053-2055.

Authentication mechanisms are the first line of defense in the system to allow only authorized users to gain access to a system's resources. Reauthentication mechanisms take place when a user's session expires to provide a continuous security to the system. Below are summarized some conventional reauthentication methods. The reauthentication methods are grouped into three categories: behavioral biometrics, graphical password and bi-factor reauthentication.

Jagadeesan and Hsiao present an accurate and easy to deploy reauthentication system based on behavioral biometrics. (See, Jagadeesan, H., & Hsiao, M. S. (2009, September). A novel approach to design of user reauthentication systems. In *Biometrics: Theory, Applications, and Systems*, 2009. BTAS'09. IEEE 3rd International Conference on (pp. 1-6). IEEE, which is incorporated herein by reference) The behavior characteristics are extracted from the user's keyboard and mouse actions. The method used the percentage of mouse and keyboard interaction ration and interaction quotient to extract the user behavior. After storing the user behavior, the reauthentication system will compare the pre-stored behavior of the user with the current behavior. If any difference in the user's behavior is detected, the system will log the user out. However, the experiment results show a decrease in the accuracy of the system if there are a huge number of users.

Another reauthentication mechanism based on behavioral biometrics was proposed by Lu and Liu (see, Lu, L., & Liu, Y. (2015). Safeguard: User reauthentication on smartphones via behavioral biometrics. *IEEE Transactions on Computational Social Systems*, 2(3), 53-64, which is incorporated herein by reference) the mechanism is dedicated to the smartphones and it provides a continuous reauthentication. The mechanism is called Safeguard. It is modeled mainly based on sliding movements and pressure parameters which is the intensity of finger pressure on the touch screen.

Each one of the previous two gestures is measured by specific features that represent the uniqueness of user's behavior. Safeguard basically comprises of four modules: 1) data recording module, 2) measurement and characterization module, 3) classifier, 4) decision maker. The first module is an Android software that runs transparently in the background to collect data about user's behavioral biometrics. The collected data is grouped and filtered in the measurement and characterization module, to produce raw data that is used in classifier. The classifier is a machine learning method, which analyze the data and outputs a score that represents the similarity between the tested and legitimate users' behaviors. Lastly, the decision maker decides if the data analyzed by the classifier are correct or not.

Additional contribution regarding reauthentication using behavioral biometrics by Selcuk, Liu and Beyah (see, Uluagac, A. S., Liu, W., & Beyah, R. (2014, October). A multi-factor re-authentication framework with user privacy. In *Communications and Network Security* (CNS), 2014 (pp. 504-505). IEEE) as they proposed a multi-factor reauthentication framework that reauthenticate using password along with user behavior profile. The use of a second factor will eliminate password vulnerability. This framework can be used with different sites and it will enroll users based on user ID, password and user profile that contains his behavior in each site.

Then, for each reauthentication, the framework will request the user to only enter his password then will compare the match between user password and newly captured user profile during the last session against the previously enrolled user data (password and user profile). Furthermore, the framework preserves the privacy of user profile by using fuzzy hashing and fully homomorphic encryption. The result of testing the proposed framework had varied results depending on the spent time in collecting user profile data during the session, as the time of collecting data increases the system performance increases. However, requiring long session from users to ensure the accuracy of the authentication reduces the usability of the framework.

Another scheme that makes use of the graphical password was proposed by Lin et al. (see, Lin, S. Y., Wei, T. E., Lee, H. M., Jeng, A. B., & Liu, C. T. (2012, July). A novel approach for re-authentication protocol using personalized information. In *Machine Learning and Cybernetics* (ICMLC), 2012 International Conference on (Vol. 5, pp. 1826-1829). IEEE, which is incorporated herein by reference), its implementation differs than the previous system. This scheme adopts e-mail address combined with a CAPTCHA. First, the user registers his information including his e-mail address. Once the user tries to login, an e-mail will be sent to him containing a password and mapping table that maps the password with a random image slot. Another picture is attached with the e-mail contains the rotation angle of each image slot. In the reauthentication page the pictures are numbered, the user chooses the pictures in the sequence of his password and should rotate each image with its corresponding rotation angle. The difficulty in this process lies in the variable length of password that will be sent to the user, therefore, even if the attacker tries to rotate the pictures by guessing, he does not know how many pictures should be rotated and in what sequence. However, if the attacker could gain an access to the victim's e-mail, the reliability of the mechanism will be broken.

A different approach of reauthentication was presented by Chhetiza and Kumar (see, Chhetiza, J., & Kumar, N. (2016). *Implementation and Performance Analysis of a Strong Bi-Factor Re-Authentication Technique in Cloud Environment*, which is incorporated herein by reference) which is a Bi-Factor Reauthentication (BFRA), the system is designed for mobile devices and depends on both possession factor and knowledge factor, the system functions on a cloud-based application server. The BFRA system authentication process operates in three phases which are registration phase, authentication phase and key Generation phase.

In the registration phase, users are requested to enter a username, password, phone number and the International Mobile Equipment Identity (IMEI) number of the user phone. In the key generation phase, with each login, the system will generate a one-time pass-code and send it as a message to user phone. This OTP is necessary for authenticating the user in the next login session, the OTP is known for both the user and the system database. Also, the system will generate Auth_code to allow the reauthenticate of users. The Auth_code is generated based on the IMEI number using android SMS API service. For authentication phase, the system will reauthenticate users for each login session by requesting the password and the OTP that was given to the user in the previous session and the system will authenticate the user for this session only if the entered password and OTP match the once stored in the database. After session time expires, the system will reauthenticate the user for the new session by requesting the Auth_code associated to the user phone IMEI number.

Conventional practical reauthentication techniques, which are classified into three categories: behavioral biometric, graphical password and bi-factor reauthentication, do not provide a practical reauthentication mechanism for systems.

Regarding the behavioral biometric it does not support scalability in terms of user's number. Also, each technique is only applicable for certain type of devices. While for the graphical reauthentication and the bi-factor reauthentication they required the user to go through a lengthy process to be reauthenticated, that affects convenience.

In contrast to the disadvantages and difficulties of conventional systems and methods, the present disclosure provides a practical reauthentication method, system and computer program product in case of a session time-out, however, most found solutions are proposed to continuously reauthenticate the user and discover illegitimate users.

The authentication method and system of the present disclosure can preferably include functional and non-functional requirements, examples of which are described below.

1) Registration

In an embodiment the authentication method and system of the present disclosure require the user to register before becoming a part of the system. The registration is necessary in order to store a username or ID, in addition to its related credentials (e.g., password and/or email address), for the first time in a secure database. After the registration process is completed successfully, the user officially can access the system.

2) Login and Authentication

In an embodiment the authentication method and system of the present disclosure require the user to login in order to authenticate and prove that he is who he claims to be. First, the user is asked to enter user credentials (e.g., user name, email address, and/or password), which should be a secret. If there is a match between the credentials that the user submits, and the credentials stored in the database, access will be granted, and the user session will start. This requirement is the main core of this project, which focuses on making the login process secure and convenient at the same time.

3) Resetting Credentials

In an embodiment the authentication method and system of the present disclosure allow the user to reset his credentials. In some scenarios, resetting credentials becomes necessary, especially if security were compromised, such as what happens when an intruder steals the user's credentials. In some other scenarios, credentials are reset for convenience purposes. For example, some users might initially set credentials that they are not comfortable with, and decide to change them later.

4) Reauthentication

In an embodiment the authentication method and system of the present disclosure allow the user to reauthenticate. Reauthentication means authenticating again after the session ends, using one authentication factor instead of two to login into the system.

5) Deactivation

In an embodiment the authentication method and system of the present disclosure allow the user to deactivate his account. Sometimes, the user may request deactivating his account by putting it out of service. This might be a result of stealing or security compromise, but not necessarily. In some scenarios, the user might not want to use the system anymore and wants to make sure that no attacker uses his account and pretending to be him.

6) Wrong Login Lockouts

In an embodiment the authentication method and system of the present disclosure permit wrong login lockout to prevent the user from logging into the system after a certain number of failed attempts. This requirement is necessary for preventing attacks like brute force, where the attacker tries all possible combinations. Furthermore, it contributes in mitigating guessing attacks where the attacker tries a group of predictable credentials.

7) Input Validation

In an embodiment the authentication method and system include of the present disclosure use input validation to verify that the input entered by the user is legitimate and compatible with other system requirements. By validating the input, it is possible to prevent attacks like SQL injection and cross site scripting, where the attacker enters a malicious code that might be interpreted as a normal input by the system. In case of neglecting input validation, one line of malicious code might be able to compromise the database and even the whole system. Although input validation is a practical method to prevent injection attacks, its role does not stop there. It is noteworthy that input validation can be used for preventing the system users from entering weak security credentials or leaving the defaults as they are.

8) Cryptographic Support

In an embodiment the authentication method and system of the present disclosure include cryptographic hashing as a main requirement that supports the security element. Hashing process refers to using one-way mathematical functions in order to generate fixed size digests that cannot be reversed into their original plain text. Although hashing is a robust method to provide data confidentiality, using it alone can make the user vulnerable for dictionary attacks, where the attacker uses a predefined hashed wordlist to crack the hash. Luckily, to avoid such attacks, salts can be added as an input for the hash function.

FIG. 1 is a diagram of an example operating environment 100 and use case for an authentication system 102 using a text file and a one-time password in accordance with some implementations. The authentication system 102 includes processes for registration, reset, deactivation, and reauthentication that are described in detail below. The authentication system 102, using the processes described herein, permits a user 104 to be authenticated to access a system 106 and system resources such as a database, etc.

Below is an analysis of the functional requirements in Table 3 based on three criteria. The first criterion is the complexity, it is determined by the type of thinking, knowledge and system resources (sessions, database) needed to accomplish the requirement. The complexity evaluation levels are as the following:

High: Requires a lot of knowledge, computations and system resources

Medium: Requires less knowledge than "high" level, computations and system resources Low: Requires few knowledge, computations and system resources The second criterion is the implementation time, it determines the time needed to implement the functionality. The evaluation levels are as the following:

Short: 7 days or less

Medium: 8-14 days

Long: More than 14 days

The third criterion is importance. This criterion determines to what extent the requirement is independently or dependently important to the system and the evaluation levels are:

Critical: System does not function properly without this requirement

Important: Provides essential functionality for the system

Less important: Removing the functionality would not affect the system drastically For instance, the registration has less complexity compared to the login functionality since the login requires more computations due to the need of verifying credentials that involves more retrievals from the database. The login functionality may take less time to be programmed since part of the code is similar to the registration code. Both registration and login functionalities are considered critical to the system and system does not function properly without them.

TABLE 3

| Requirement | Complexity | Implementation Time | Importance |
| --- | --- | --- | --- |
| Registration | Medium | Long | Critical |
| Login and Authentication | High | Medium | Critical |
| Resetting Credentials | High | Short | Important |
| Reauthentication | High | Long | Critical |
| Deactivation | Low | Short | Important |
| Wrong login lockouts | Medium | Short | Important |
| Input Validation | Medium | Medium | Important |
| Cryptographic support | High | Medium | Critical |

Some non-functional requirements that elaborate the performance criteria of the authentication and reauthentication method and system of the present disclosure include:

1) Generalization

The authentication and reauthentication methods of the present disclosure shall be applicable solution for multiple types of systems not a system-specific solution.

2) Trustworthiness

The authentication and reauthentication method and system of the present disclosure shall meet the requirements of an authentication system; therefore, it should provide correct identification of the user, ensure issuance of credentials which means to convey an assigned credential to the exact user and only that user, and manage the credentials security.

3) Convenience

The authentication and reauthentication method and system of the present disclosure shall be convenient for the user, so it eliminates the inconvenience of using password or provides the same level of convenience in both stages authentication and reauthentication. Also, the implementation of reauthentication mechanism will raise the user convenience level as the user does not have to be reauthenticated by the two factors each time.

4) Speed

The authentication and reauthentication method and system of the present disclosure shall provide an acceptable response time, to enhance the effectiveness and efficiency of the system in addition to the user experience and acceptance.

5) Cost-Effective

The authentication and reauthentication method and system of the present disclosure shall be cost-effective in terms that the monetary amount spent in raising the security, offering user convenience and providing an appropriate level of speed should pay off. Additionally, the system should not require excessive cost to be deployed.

6) Attacks Resilience

The authentication and reauthentication method and system of the present disclosure shall address the CIA of security confidentiality, integrity and availability by being resilient to several types of attacks, such as DoS, brute force and session hijacking.

Analyzing the non-functional requirements is a little different than the functional requirements. An implementation time criterion is not applicable since it is related to the implementation time, while the non-functional requirements are determined within the authentication and reauthentication method and system of the present disclosure.

Moreover, the definition of the complexity in non-functional requirements differs, complexity of the requirement is determined based on whether achieving it will scarify the achievement of another requirement or not. The evaluation of this criterion is as the following:

High: Implementation of the requirement affects the implementation of another requirement Medium: Implementation of the requirement could affect the implementation of another requirement Low: Implementation of the requirement has a minor or no effect on the implementation of another requirement For instance, the complexity of generalization requirement (authentication and reauthentication method and system of the present disclosure must be applicable to different systems) is low since it does not affect other requirements. While the complexity of implementing the cost, convenience and speed requirements is high since there is a tradeoff between them. The complexity of Implementing an attack resilient solution is medium, since some attack protection could affect other requirements such as the user convenience and the cost.

TABLE 4

| Requirement | Complexity | Importance |
| --- | --- | --- |
| Generalization | Low | Critical |
| Trustworthiness | Low | Critical |
| Convenience | High | Critical |
| Speed | High | Important |
| Cost-effective | High | Important |
| Attack Resilience | Medium | Critical |

Authentication and Reauthentication Method and System

The authentication and reauthentication method and system of the present disclosure may alternately be referred to herein as "PassText" and is preferably a text file containing certain meaningful text that is prompted to the user, so he must modify it by adding, removing or changing characters. Then, each time the user wants to access the system, the same original text file will be prompted to him and he must apply the exact modifications to the file. Some implementations can include bcrypt which is a Blowfish based one-way hashing algorithm that is known for its slowness. Its slowness and multiple rounds ensure draining the attacker's resources, which prevents dictionary and brute force attacks. Furthermore, bcrypt has salts built-in, which helps in preventing rainbow table attack. bcrypt is considered slow compared to other hashing algorithms, however, its slowness is not considered an issue since 3 PassTexts could be hashed in one second.

The main advantage of PassText over the password is it provides a kind of visualization, users tend to remember what they can see and interact with. To implement a strong authentication system, OTP will be used as a second authentication factor besides the PassText. For the practical reauthentication, the user must only modify the PassText whenever he logged out or the session has been expired.

Below, the authentication and reauthentication method and system of the present disclosure (PassText) is compared with conventional solutions. First, a single factor authentication comparison between PassText authentication and graphical user authentication. Second, a 2FA comparison between "Absher" which is a web based application that uses the combination of a password and an OTP sent using SMS and the disclosed solution which uses a combination of PassText and an OTP sent using email.

Graphical User Authentication (GUA), it is a password based on images. There are multiple methods of applying this concept, however, the general one is that the user selects an image from a set of images, then the image is divided into grids, so the user selects some parts of the picture.

The user's password will be the selected parts entered in the same order in the registration phase.

As is the case with GAU, the disclosed PassText depends on some modifications or choices done by the users. But a difference is that instead of prompting the user a set of images, asking to choose one of them and selects some parts of the grid image, the user will be provided with a PassText to modify it by adding, removing or changing characters in a way that the hash value of the modified PassText differs from the hash value of the original PassText.

The GUA systems mentioned earlier were applied in a 2FA manner to prevent shoulder surfing attack, since the images are easy to be observed. The comparisons are done based on four different perspectives: speed, dictionary attack, shoulder surfing attack and convenience.

1) Speed

Authentication processes using image-based passwords are longer than authentication using alphanumeric password.

(See, N. Cherdmuangpak, T. Anusas-amonkul and B. Limthanmaphon. (2017). "Two factor image based password authentication for junior high school students". *International Joint Conference on Computer Science and Software Engineering (JCSSE)*, Nakhon Si Thammarat, pp. 1-6; and Vaithyasubramanian, S., Christy, A., & Saravanan, D. (2015). 2FAS FOR SECURED LOGIN IN SUPPORT OF EFFECTIVE INFORMATION PRESERVATION AND NETWORK SECURITY. *ARPN Journal of Engineering and Applied Sciences*, 2053-2055, which are incorporated herein by reference). Based on that the authentication process of the proposed system with an average modification complexity would be faster than graphical password.

2) Dictionary Attack

Password systems are vulnerable to dictionary attacks where the attacker is trying every possible combination to get the password. For the proposed graphical password, to find an 8-image password, each image is in 8 different pages and there are 100 images on each page "there are $100^8$, or 10 quadrillion (10,000,000,000,000,000), possible combinations that could form the graphical password." (See, Khairnar, M. P. M., Nagare, M. K. K., Agrawal, M. R. V., & Mahale, M. A. U. (2016). Securing password against online password guessing attacks using graphical password. *Imperial Journal of Interdisciplinary Research*, 2(3), 241-244, which is incorporated herein by reference). While for PassText, to find the modification in 100 characters long file, in assumption that the user did not change the length of the file, there are infinite possible combination to try.

3) Shoulder Surfing Attack

Most of the graphical passwords techniques may have the risk of shoulder surfing attacks because of the observable nature of the images, which is why they are usually used with second authentication factor. An attacker can easily observe what is displayed while the user is entering his graphical password. For the hash PassText it is vulnerable to shoulder surfing attack as well, but to a less extent comparing with the graphical passwords, since it is hard to detect the changes in a stuffed text.

4) Convenience

Graphical password offers convenience for the user from memorizing perspective. It is easier for human to recall images, shapes and patterns than recalling a text. However-PassText does not require the user to memorize a text, instead, the user is required to memorize a modification, the modifications are based on the user preference, this allows the user to remember the modifications even better.

As Table 5 shows, the disclosed PassText method and system are better than the graphical password and faster and offers a better resilience for the shoulder surfing attack.

TABLE 5

Table 5 Comparison Between PassText and Graphical Password

| Comparison Criteria | PassText | Graphical Password |
|---|---|---|
| Speed | ▲ | ▼ |
| Resilience for Dictionary Attack | = | = |
| Resilience for Shoulder Surfing Attack | ▲ | ▼ |
| Convenience | = | = |

▲ More
▼ Less
= Equal

Absher is a web based governmental system that uses a combination of a password and an OTP sent using SMS to authenticate users. A comparison between the Absher system and PassText is done based on five perspectives: speed, dictionary attack, shoulder surfing attack, convenience and cost-effectiveness.

1) Speed

Both solutions almost offering the same speed level, since both are based on the concepts of hashing and sending OTP.

2) Dictionary Attack

The password policy of "Absher" states the need of at least eight characters and no limit for the number of characters. This allows an infinite combination of passwords as PassText. However, when specifying the limit to be eight characters, people tend to set their passwords to eight characters or not exceeding ten or twelve characters. PassText limits the number of characters to 100, but the user is just required to add delete or change at least one character in the PassText.

3) Shoulder Surfing Attack

Both solutions almost exposed to shoulder surfing attack to same extent, even though the PassText is displayed in plaintext on the screen, it is difficult to memorize the changes between one hundred characters.

4) Convenience

PassText eliminates the memory-wise effort needed to memorize a sequence of characters, since all what the user needs to memorize is at least one change to the PassText.

5) Cost-effectiveness

Sending OTP using the email is more cost-effective than using SMS, especially when the proposed solution is general and could be adopted by different systems.

As Table 6 shows, the PassText 2FA system is better than the Absher system in the resilience for the dictionary attack, as it is more convenient and more cost-effective than Absher since it employs email to send the OTP for the user. However, both systems almost have the same speed and offers comparable level of resilience against the shoulder surfing attack.

TABLE 6

Table 6 Comparison Between the Proposed Solution and "Absher" System

| Comparison Criteria | Password + OTP using SMS | PassText + OTP using Email |
|---|---|---|
| Speed | = | = |
| Resilience for Dictionary Attack | ▼ | ▲ |
| Resilience for Shoulder Surfing Attack | = | = |
| Convenience | ▼ | ▲ |
| Cost-effectiveness | ▼ | ▲ |

▲ More
▼ Less
= Equal

Database is a component in the PassText authentication system. It preferably includes three tables: User to store information about the user, PassText to store the original PassText and its hash value, and Secret_Hashes to store all users' PassTexts hash value and their OTP.

This section lists example entities and fields. Table 7 shows an example data dictionary of the system.

TABLE 7

| Entity | Field | Description |
|---|---|---|
| User | User_ID | The user ID number |
|  | Status | The status of the user, if his account is active or inactive |

TABLE 7-continued

| Entity | Field | Description |
| --- | --- | --- |
| | Username | User's name |
| | E-mail | User's e-mail |
| | Phone_Number | User's phone number |
| PassText | PassText Number | PassText file number |
| | Original_PassText | The original PassText file |
| Secret_Hashes | Original_Hash | The original hash of PassText file |
| | Use_PassText_Hash | Stored PassText hash for the user |
| | OTP Hash | The onetime password |
| | H_UserID | The user ID number |

Figure 2:
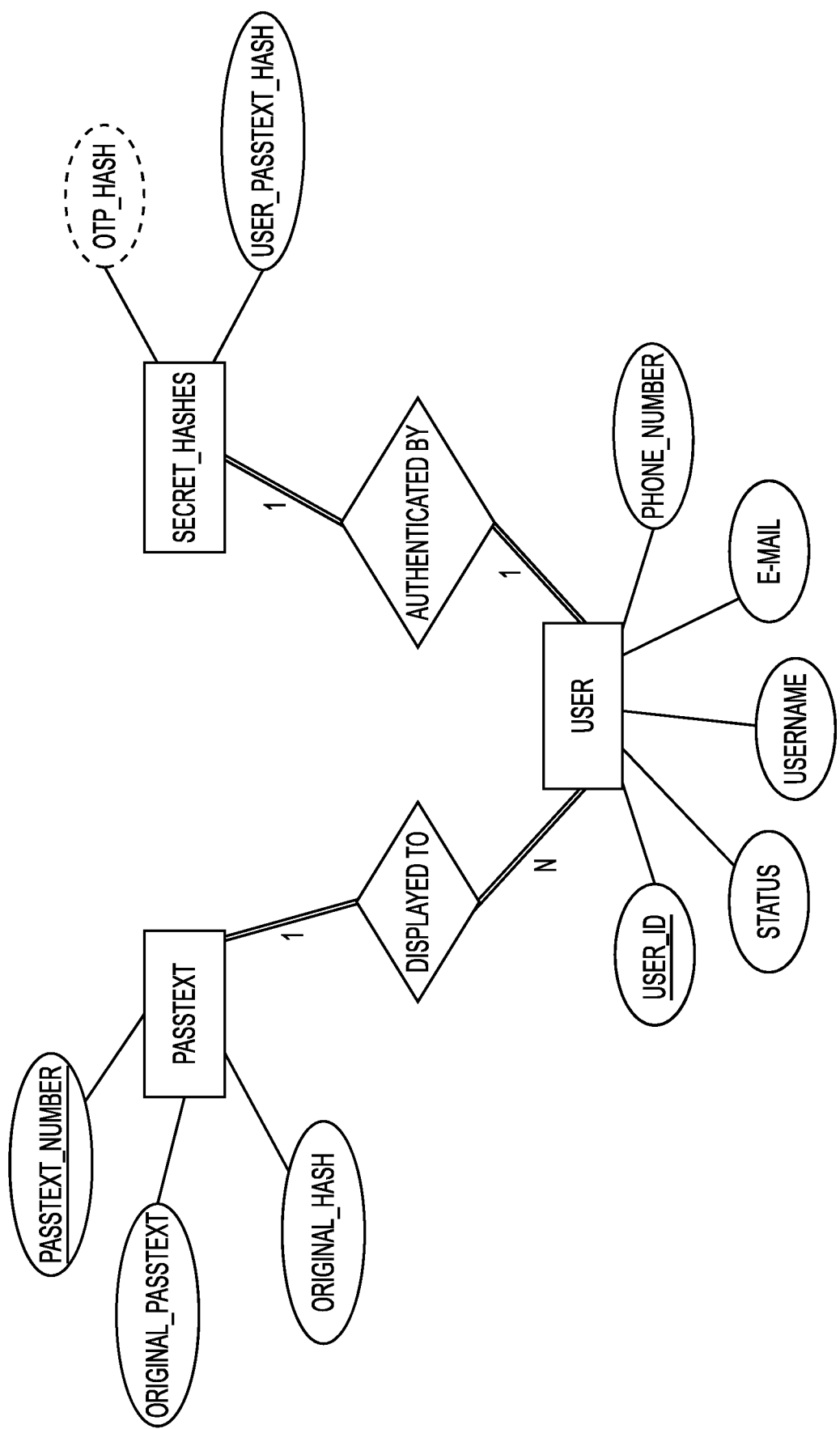
FIG. 2 is an ER diagram of an example authentication system database in accordance with some implementations.

FIG. 2 is a database entity relationship (ER) diagram of an example authentication system database in accordance with some implementations. The ER diagram is used to show the relationships of entities stored in the database. ER diagrams describe the logical structure of the database.

Figure 3:
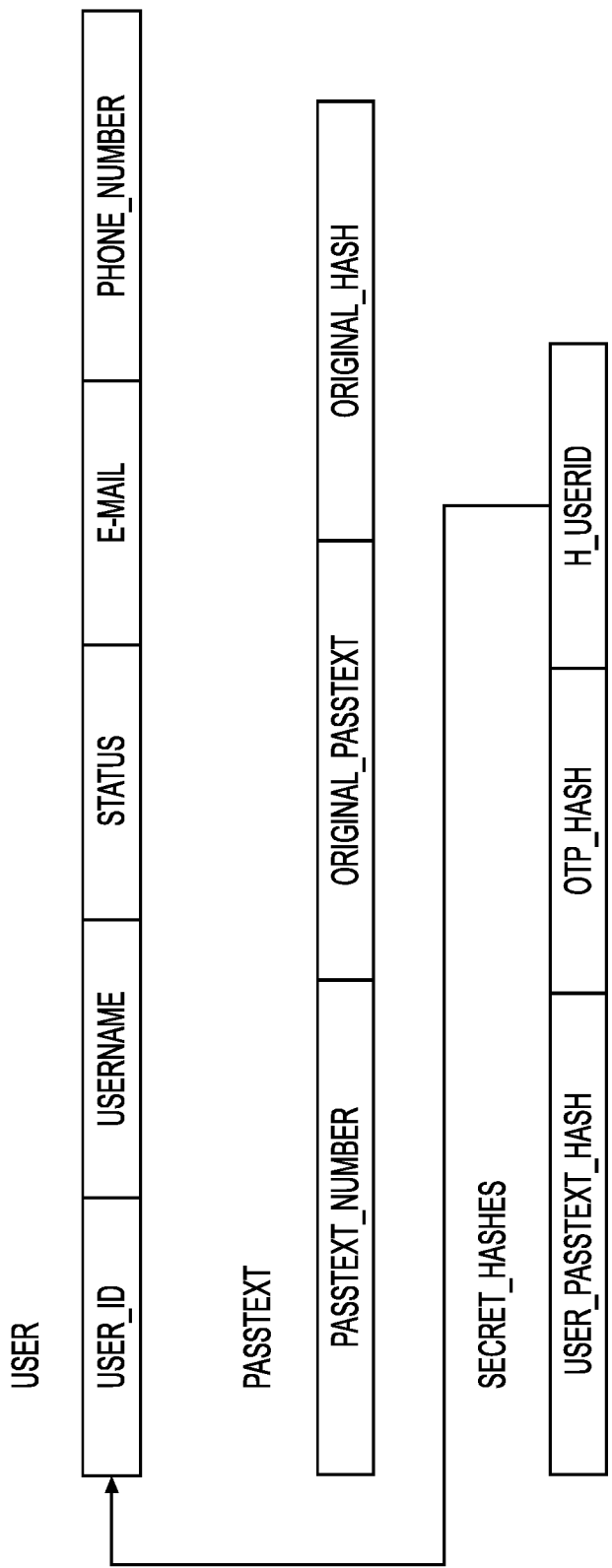
FIG. 3 is a diagram showing a database mapping for an authentication system in accordance with some implementations.

FIG. 3 is a diagram showing a database mapping for an authentication system in accordance with some implementations.

The user can view his own credentials and information. The database entities, fields, data types, and constraints are shown in the table below.

TABLE 8

| Entity | Field | Type | Constraints |
| --- | --- | --- | --- |
| User | User_ID | VARCHAR(10) | Primary Key, Not Null, Unique |
| | Status | ENUM('Active', 'Inactive') | Not Null |
| | Username | VARCHAR(20) | Not Null |
| | E-mail | VARCHAR(45) | Not Null, Unique |
| | Phone_Number | INT(10) | Not Null, Unique |
| PassText | PassText_Number | INT(10) | Primary Key, Not Null, Unique |
| | Original PassText | VARCHAR(100) | Not Null |
| | Original Hash | VARCHAR(60) | Not Null |
| Secret_Hashes | User_PassText_Hash | VARCHAR(60) | Primary Key, Not Null, Unique |
| | OTP_Hash | VARCHAR(60) | Allow Null |
| | H_UserID | VARCHAR(10) | Foreign Key, Not Null |

Implementations of the disclosed PassText authentication system follow with flow charts of the system as well as sequence diagrams for each functionality.

Figure 4:
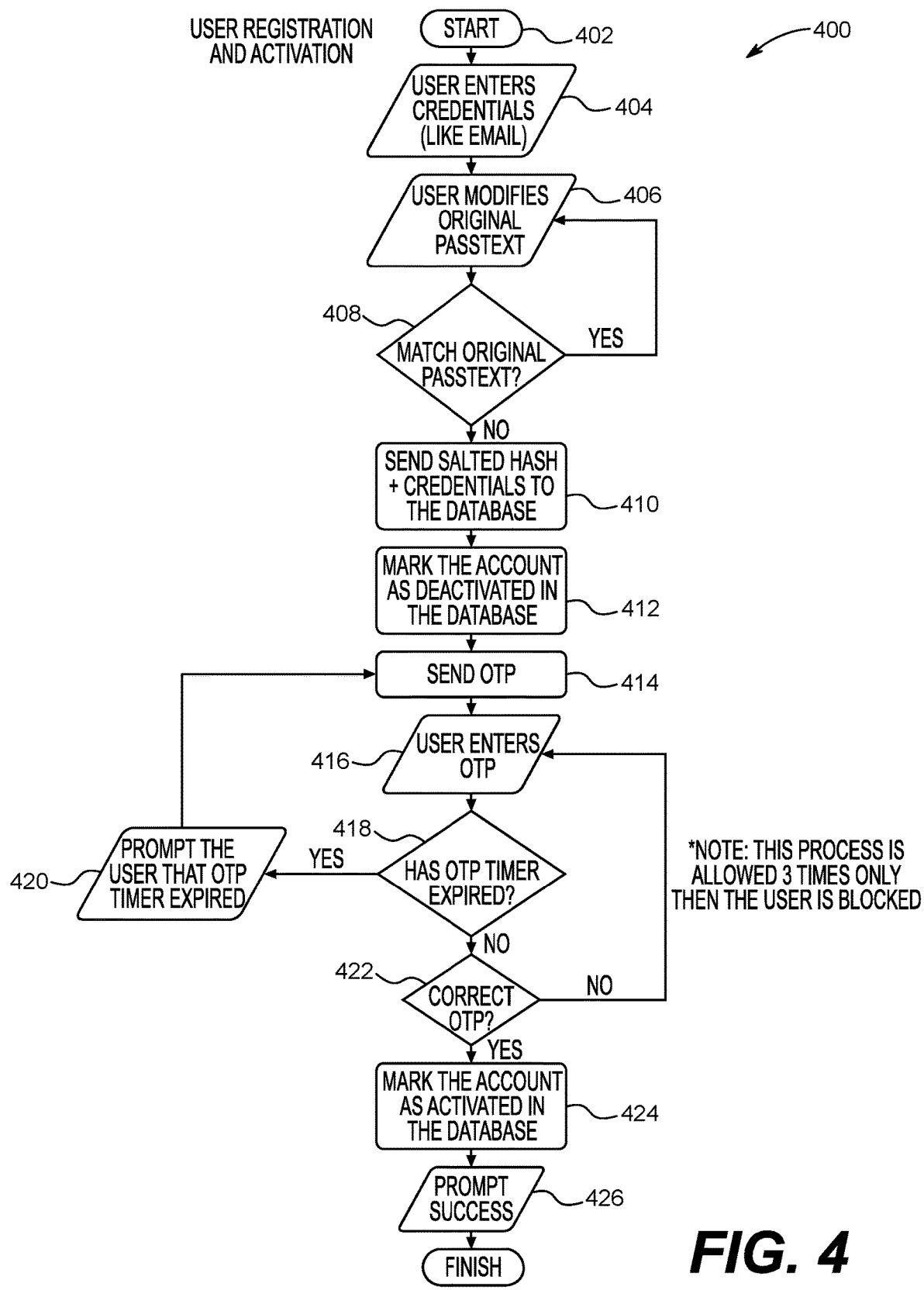
FIG. 4 is a flowchart showing an example registration and activation in accordance with some implementations.
Figure 9:
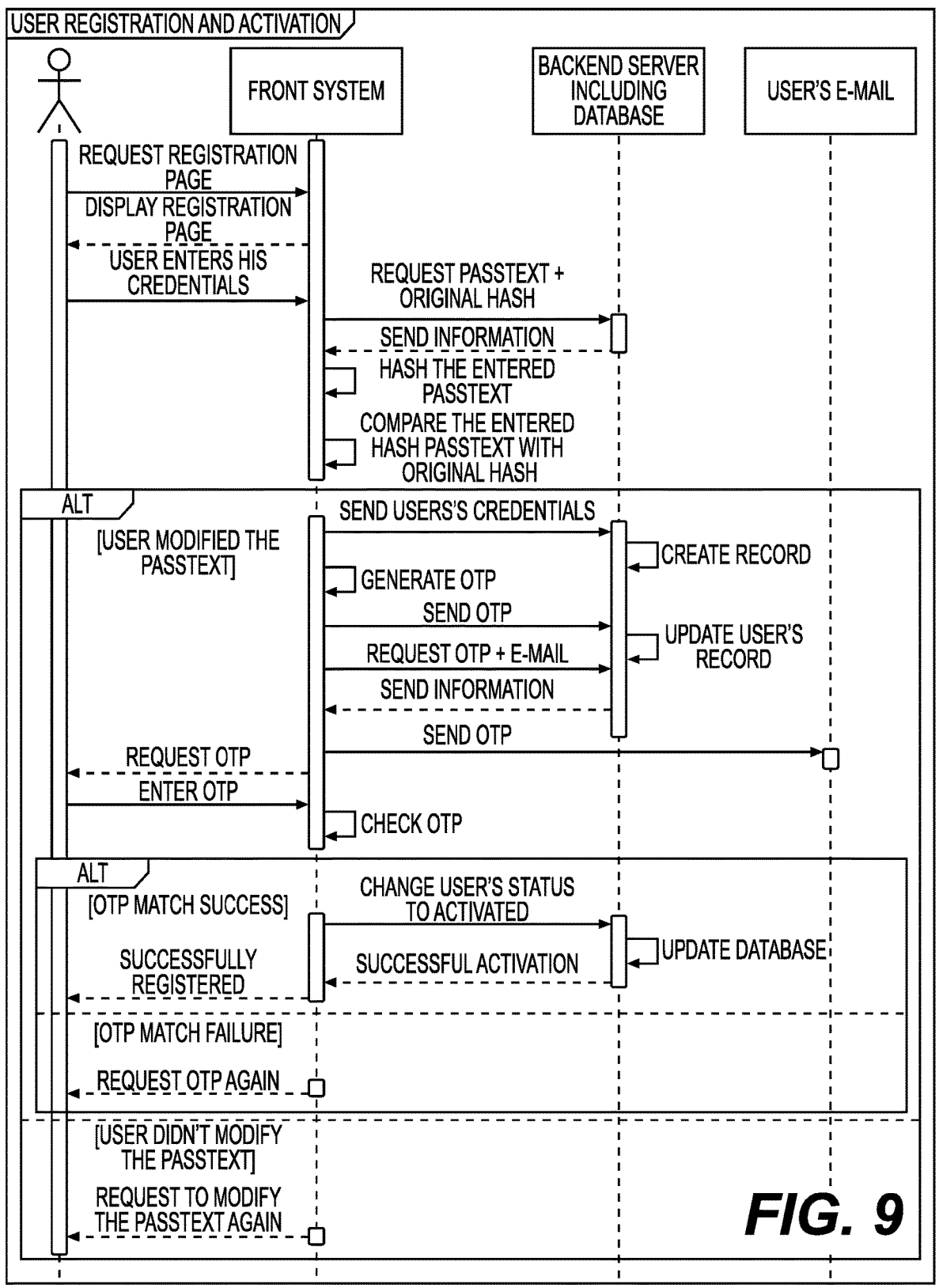
FIG. 9 is a diagram of an example registration and activation sequence in accordance with some implementations.

In the registration process, the user is asked to enter user credentials. The user credentials include, for example, the username, which is a unique identifier, email and phone number. After that, the user is prompted the special PassText that he must modify. It is noteworthy that the user can modify the file by adding or deleting any character/characters he chooses, which makes this method invincible to attacks like brute force, dictionary or even guessing. After modifying the PassText, a hash will be generated. In order to confirm that the user did not leave the PassText without modification, the hash of the original PassText is compared to the hash of the modified PassText. In case there is a match, the user will be asked to modify the PassText before he can proceed. The purpose of forcing the user to modify the PassText is to avoid dictionary attacks resulting from leaving the default PassText as it is. After file modification is completed successfully, a record will be created in User table to store user information with considering that user status will be set to deactivated. Then, the user will be sent an OTP to verify that he is the actual owner of the email that he entered, which will be used in the login process later. It is important to notice that the user must enter the OTP before the session ends, or he will have to request a new OTP. Also, each user will be given three attempts to enter the OTP correctly, or he will be blocked in order to protect from brute force attack. FIGS. 4 and 9 show the flow chart and sequence diagram of the registration process.

Figure 5:
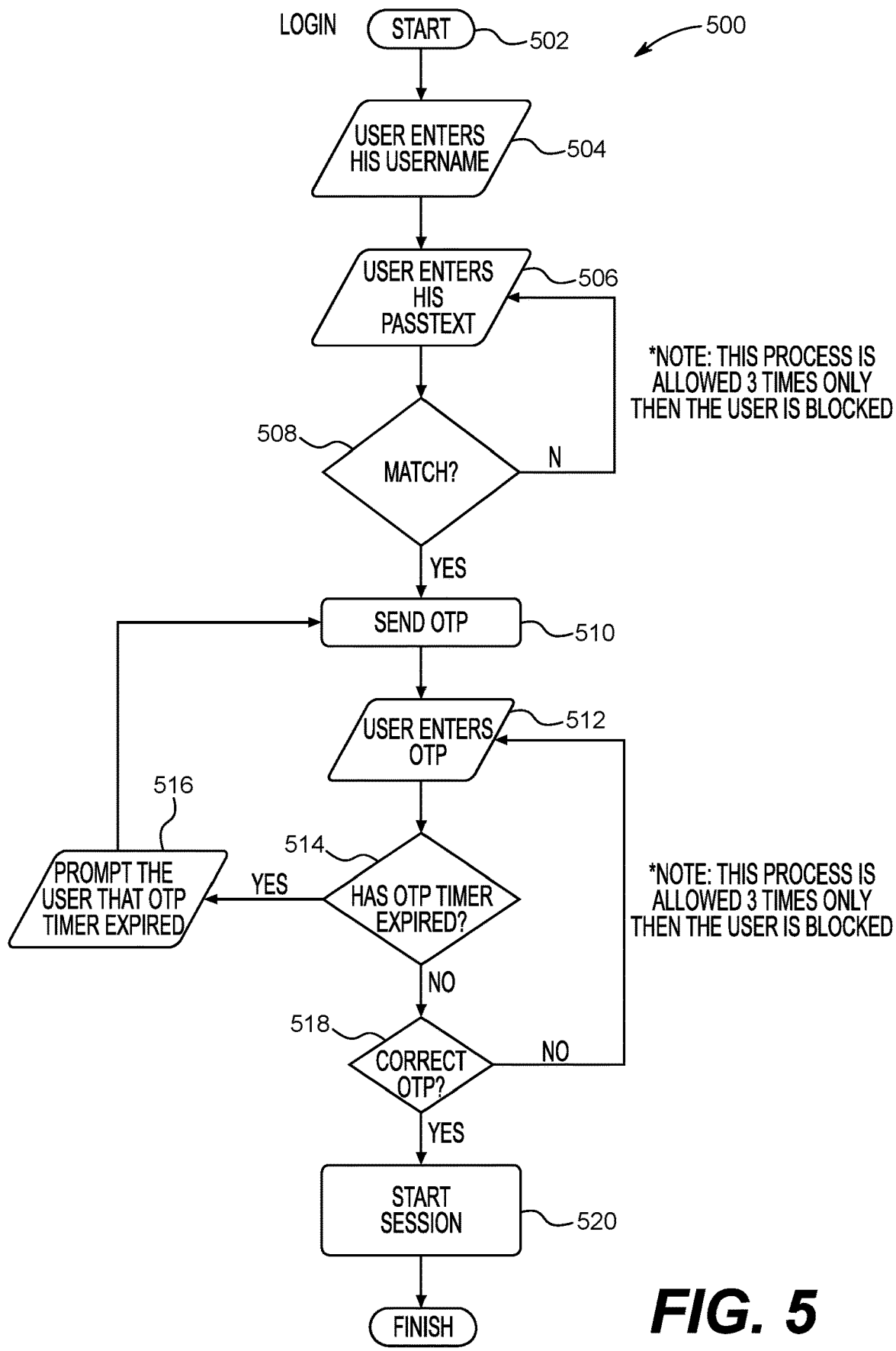
FIG. 5 is a flowchart showing an example log in process in accordance with some implementations.
Figure 10:
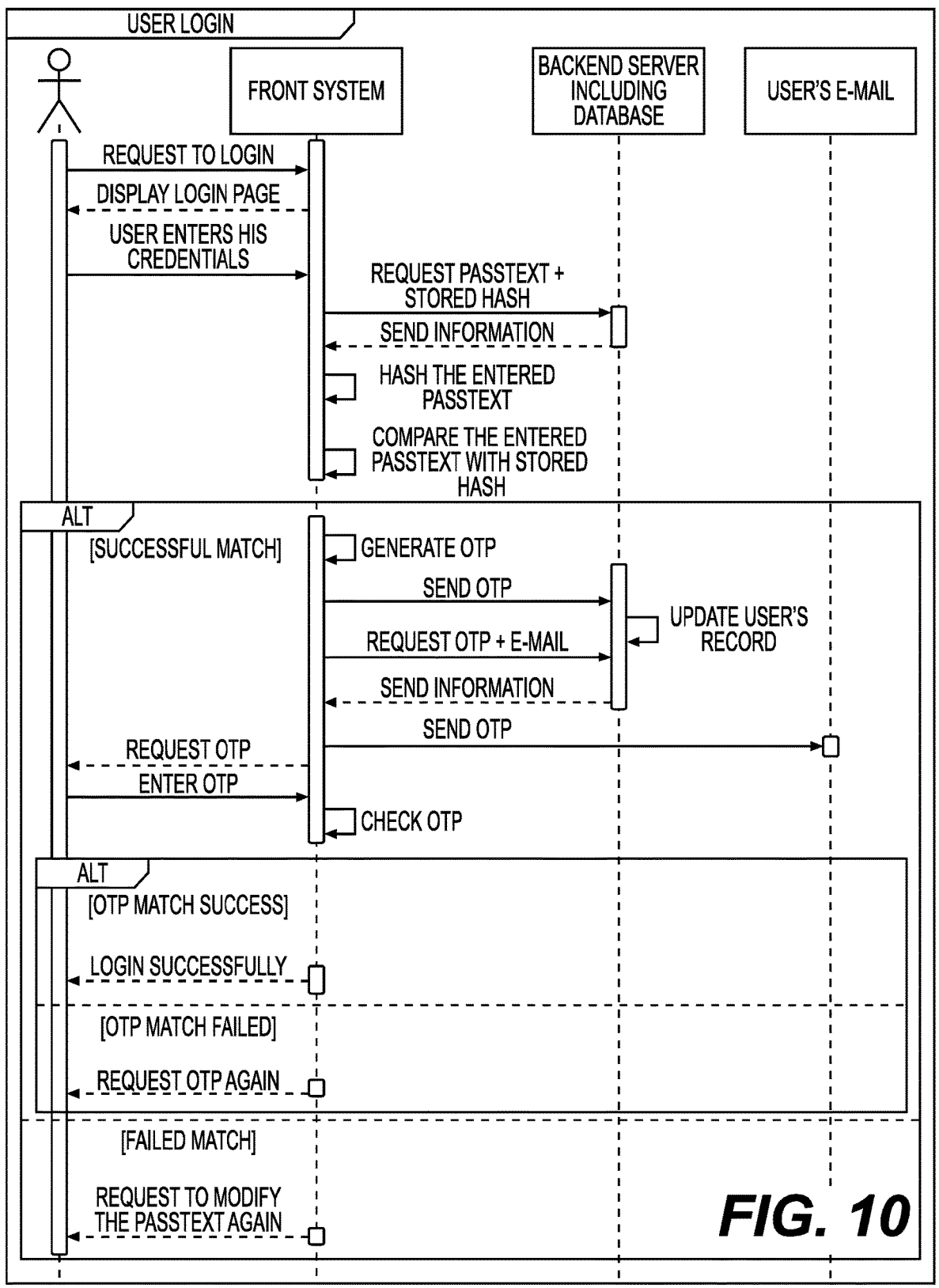
FIG. 10 is a diagram of an example login sequence in accordance with some implementations.

Login to the system requires entering the username and the PassText. If the hash of the PassText did not match the hash of the PassText stored in the database, the user will have three attempts to re-enter the PassText and after the third failed attempt, the account will be blocked. However, in case of a hash match, an OTP will be sent to user email and the login process will be completed when the user enters the received OTP correctly. After a successful login, the session will be started. FIGS. 5 and 10 illustrate the login procedures.

Figure 6:
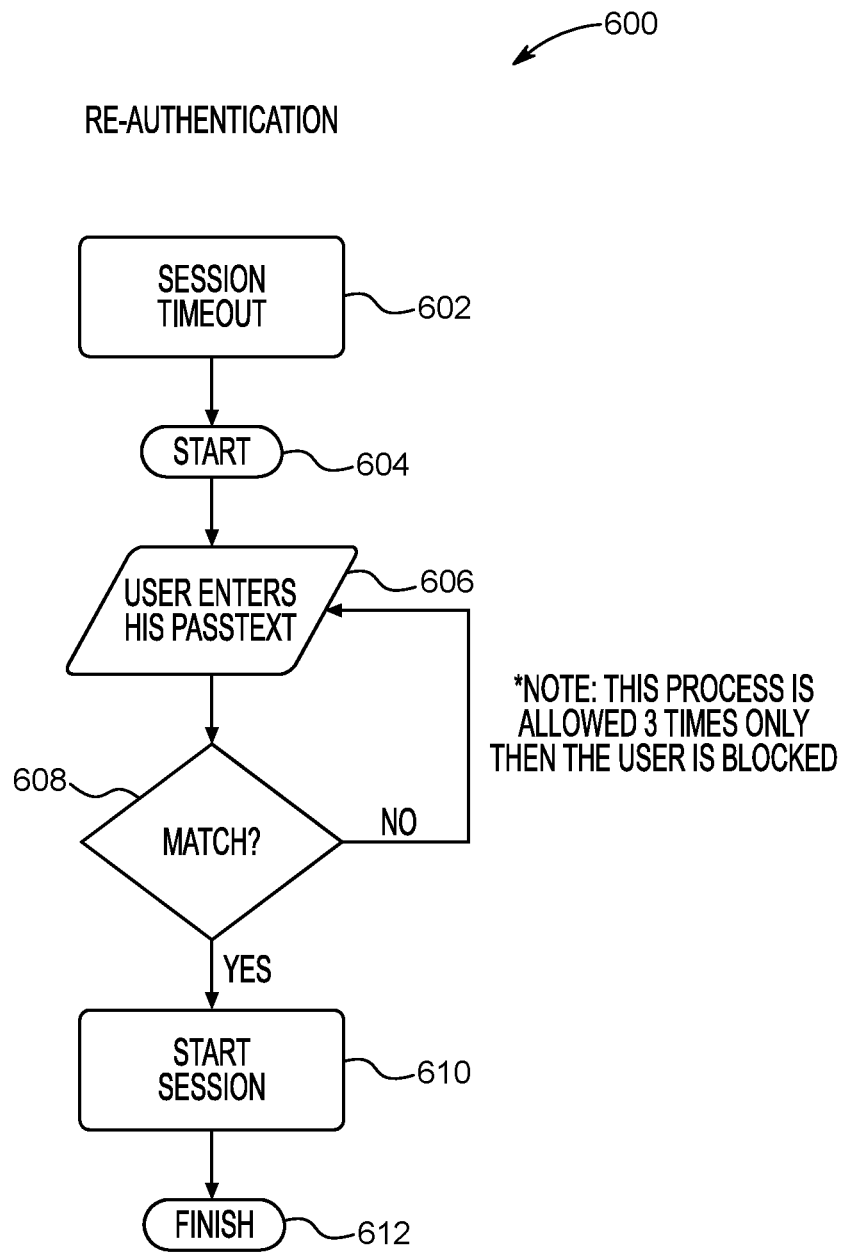
FIG. 6 is a flowchart showing an example reauthentication process in accordance with some implementations.
Figure 11:
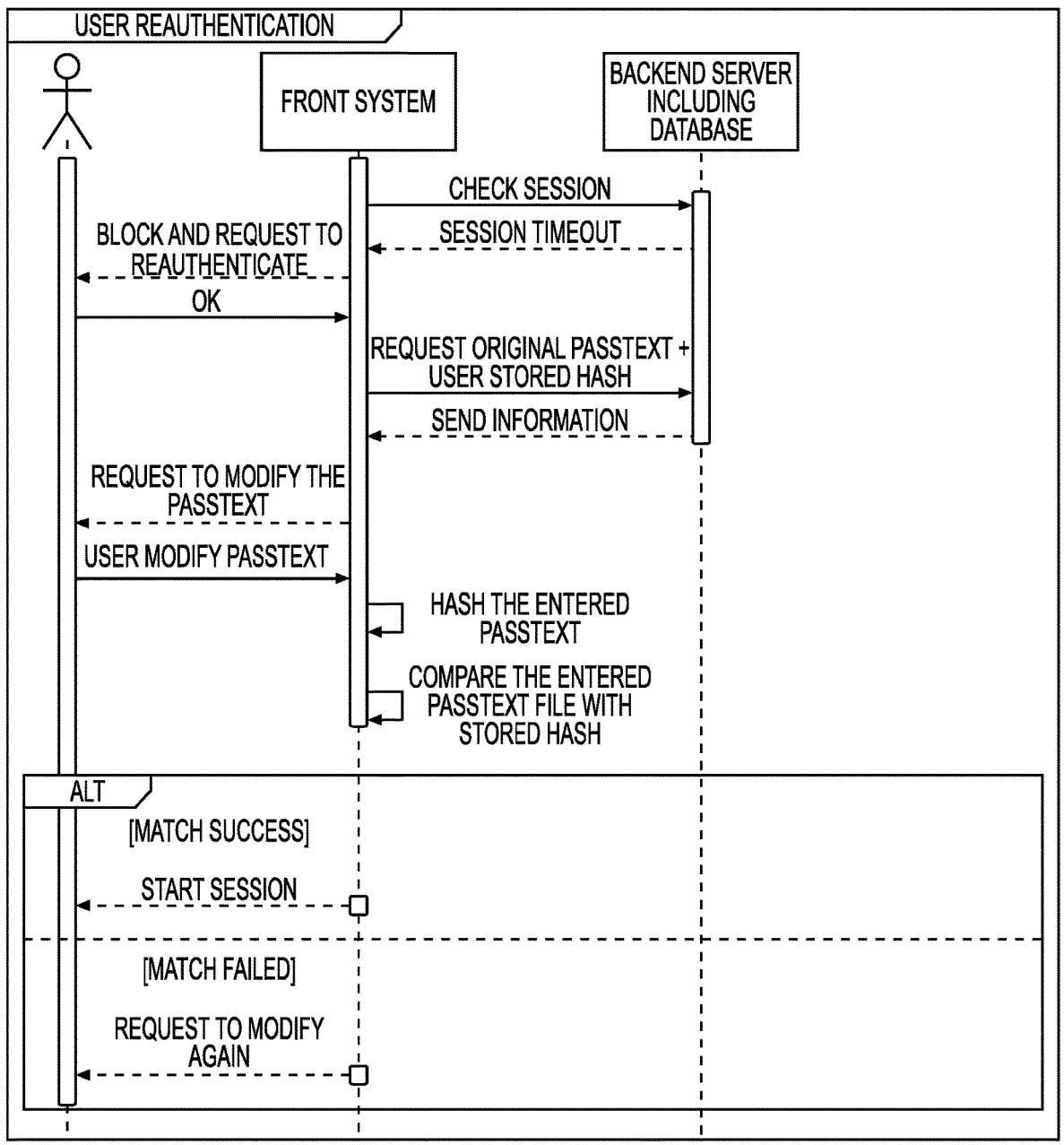
FIG. 11 is a diagram of an example reauthentication sequence in accordance with some implementations.

When session times out, the user can reauthenticate again. FIGS. 6 and 11 show the flow and sequence diagrams of the reauthentication process. The user will be reauthenticated by entering the PassText. If the hash of the modified PassText did not match the hash of the PassText stored in the database, the user will have three attempts to re-enter the PassText and after the third failed attempt, the account will be blocked. However, in case of a hash match, a new session will start.

Figure 7:
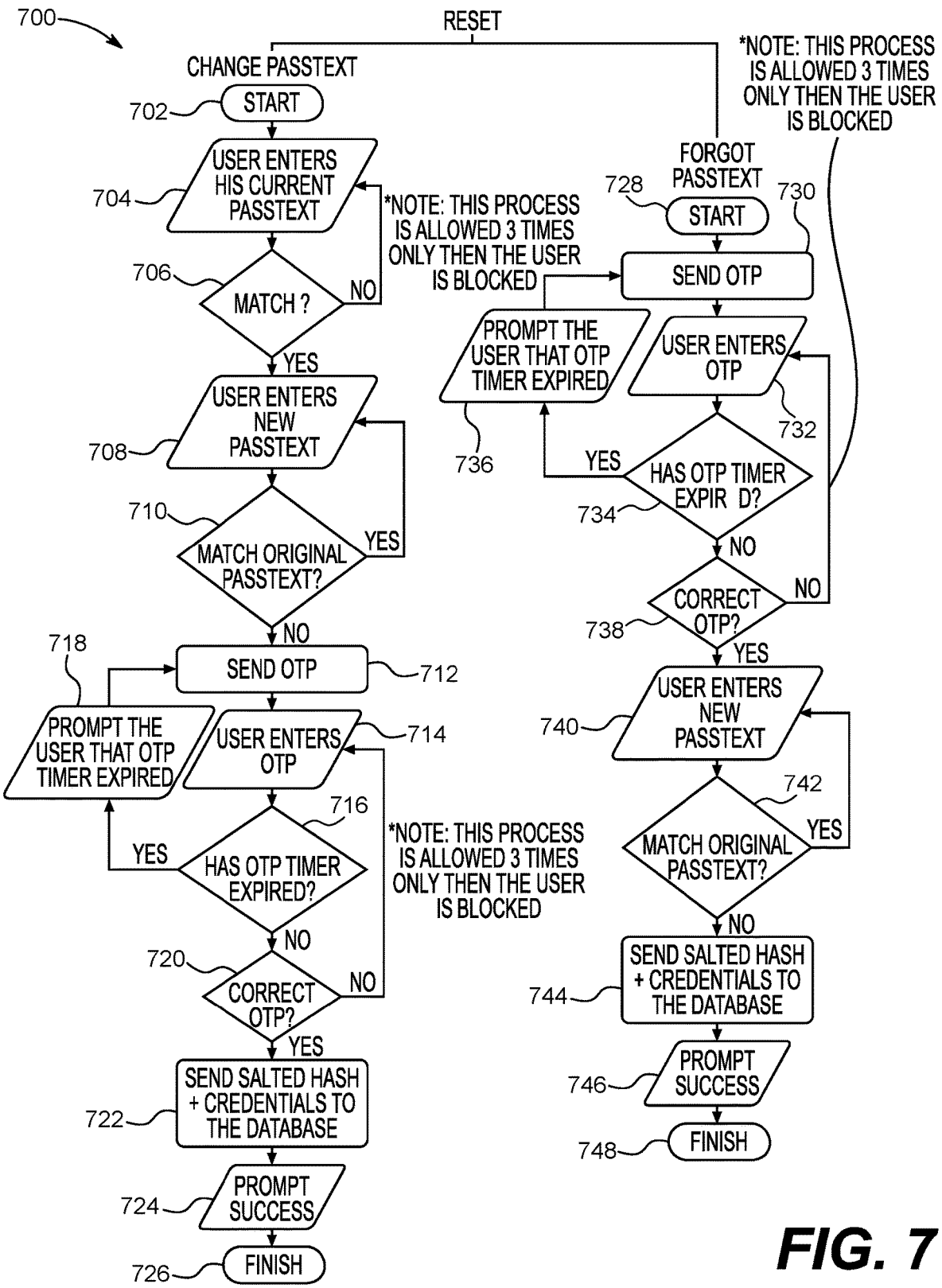
FIG. 7 is a flowchart show an example PassText reset process in accordance with some implementations.

The PassText reset process has two different cases, FIG. 7 shows the flow chart of the two cases. The first case is when the user willingly wants to change the PassText, in this case the user needs to be logged in and trigger the PassText reset event, the system asks the user to enter the current PassText, if the hash of the PassText matches the user's stored hash in the database, the user will be prompted to enter the new PassText. If the user's new PassText hash does not match the original PassText hash, an OTP will be sent to the user's email, if the user enters a correct OTP, the system will store the salted hash to the database.

Figure 13:
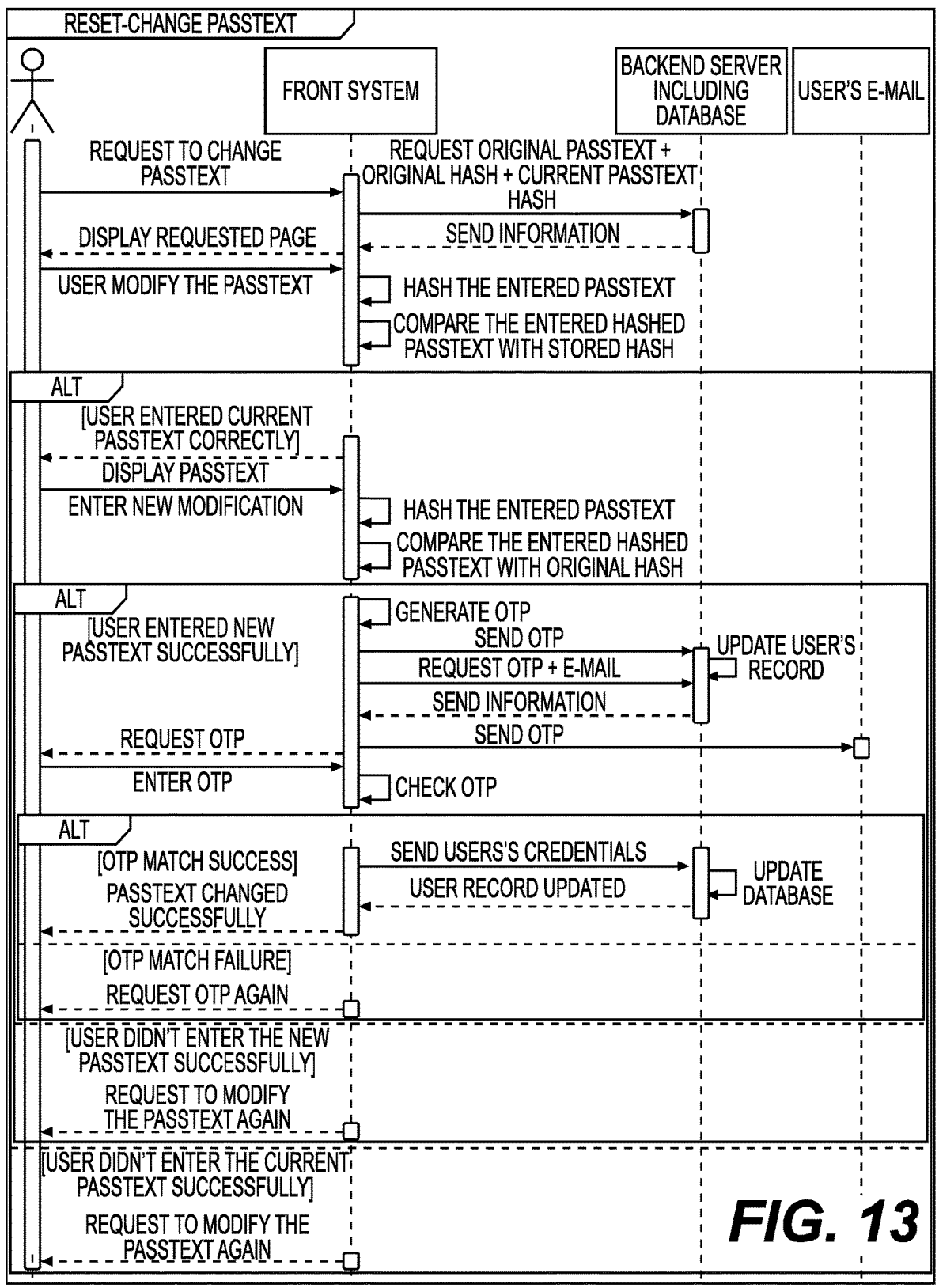
FIG. 13 is a diagram of an example PassText reset/change sequence in accordance with some implementations.
Figure 14:
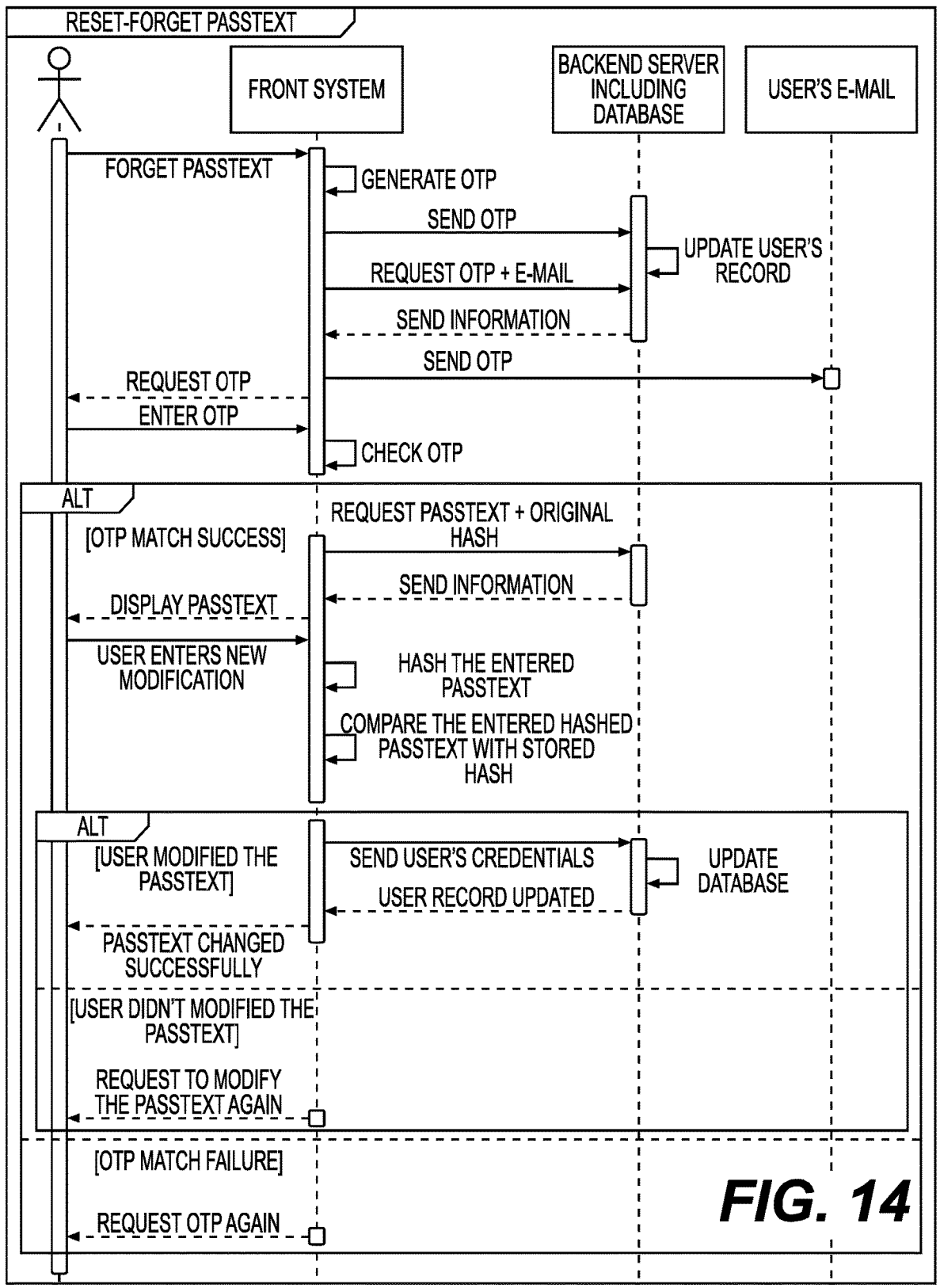
FIG. 14 is a diagram of an example PassText reset-forgot sequence in accordance with some implementations.

The second case of PassText reset is when the user forgets his PassText modifications, in this case an OTP will be sent to the user's email, if the user enters a correct OTP, he will be prompted to enter the new PassText modifications, if the user's new PassText hash does not match the original PassText hash the PassText salted hash will be stored in the database. FIGS. 13 and 14 illustrate the two example reset cases in sequence diagrams.

Figure 8:
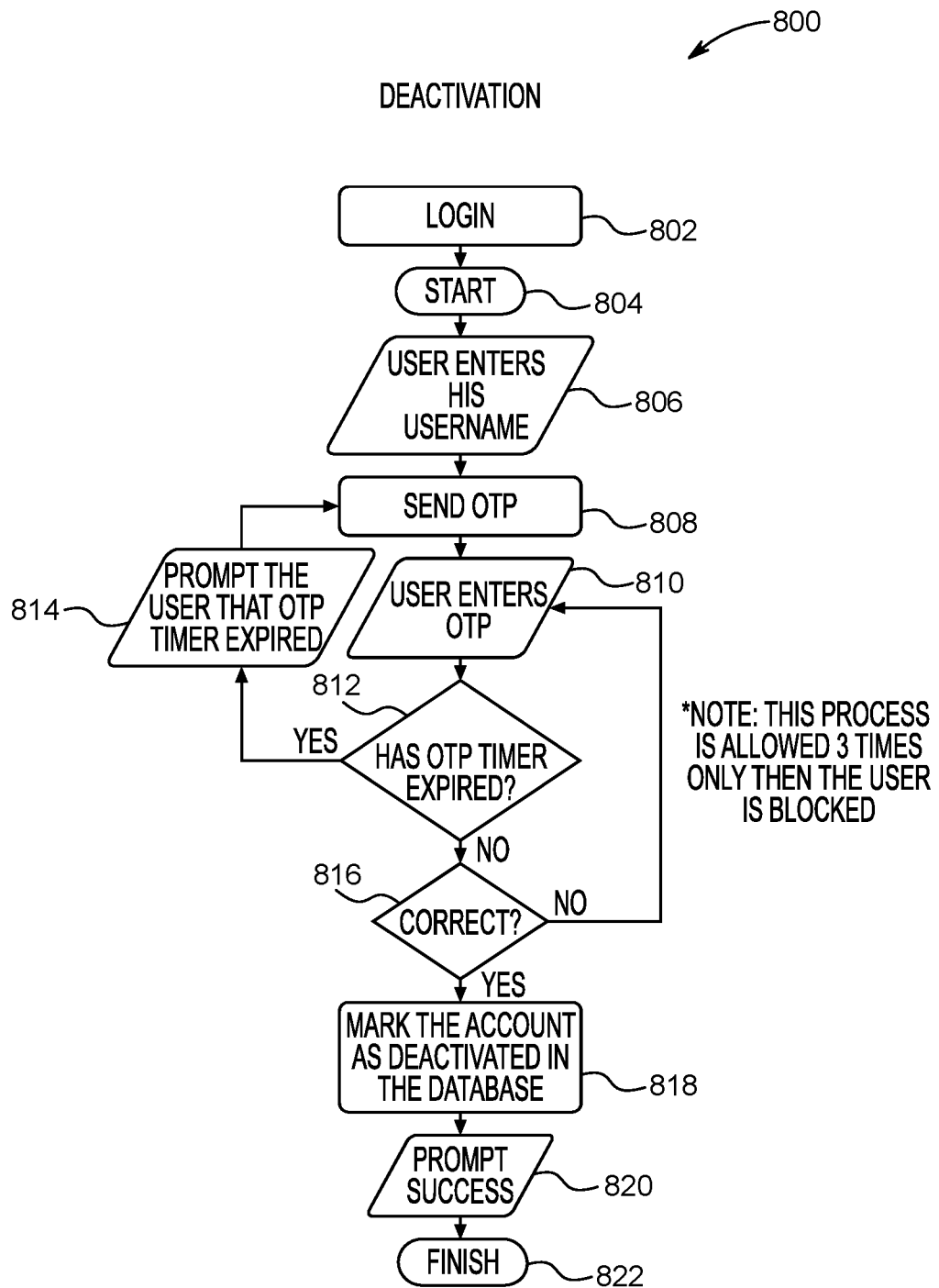
FIG. 8 is a flowchart showing an example deactivation process in accordance with some implementations.
Figure 12:
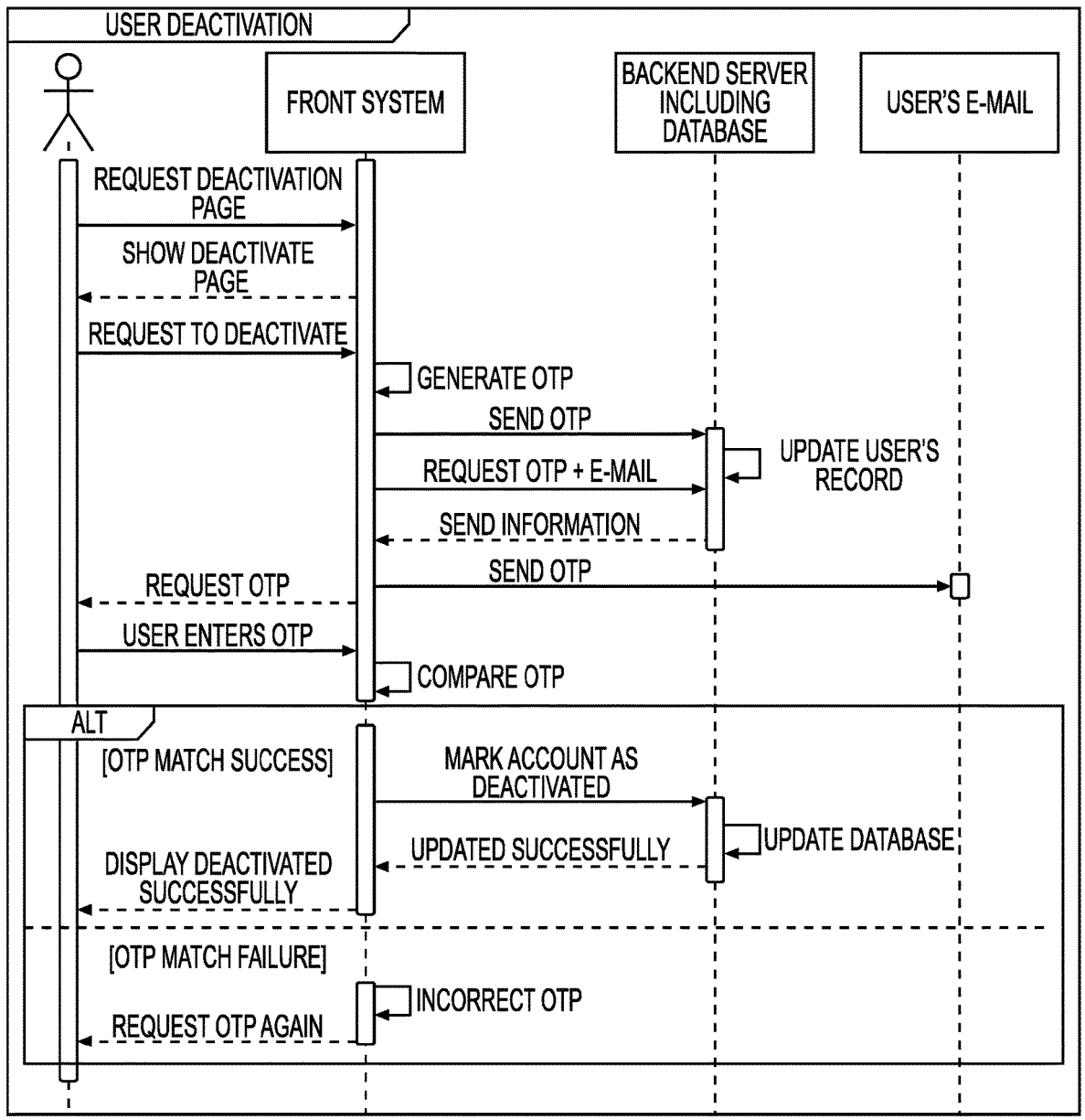
FIG. 12 is a diagram of an example deactivation sequence in accordance with some implementations.

In case of user secret PassText get compromised, the user account can be deactivated by first login. Then, a one-time password OTP will be sent to user email and the user is required to enter this OTP correctly with a limit of three attempts to be authenticated. If the OTP expired the user will be notified and another OTP will be generated. After authenticating the user, the account state in the database will be updated to "deactivated". FIGS. 8 and 12 show the flow chart and the sequence diagram of the deactivation process.

Detailed examples of pseudocode of the previous mentioned functionalities are provided below.

FIG. 4 is a flowchart showing an example registration and activation process 400 in accordance with some implementations. Processing begins at 402 and continues to 404.

At 404, user credentials are received. Processing continues to 406.

At 406, the user modifies PassText and the modified PassText is received. Processing continues to 408.

At 408, it is determined whether the modified PassText matches the original PassText. If the two match, processing returns to 406. If the two do not match, processing continues to 410.

At 410, a salted hash of the modified PassText and credentials are stored in a database and associated with the user. Processing continues to 412.

At 412, the account is marked as deactivated in the database. Processing continues to 414.

At 414, a one-time password (OTP) is sent to the user (e.g., sent to an email entered by the user as part of the credentials). Processing continues to 416.

At 416, the user enters the OTP (e.g., in a confirmation interface). Processing continues to 418.

At 418, it is determined if the OTP timer has expired. If so, processing continues to 420, otherwise processing continues to 422.

At 420, the user is prompted that the OPT timer has expired and processing returns to 414.

At 422, it is determine if the user entered the correct OTP. If so, processing continues to 424, otherwise processing returns to 416.

At 424, the account is marked as active in the database. Processing continues to 426.

At 426, the user is prompted that the registration was successful. Processing continues to 428, where processing for the registration ends.

FIG. 5 is a flowchart showing an example log in process 500 in accordance with some implementations. Processing begins at 502 and continues to 504.

At 504, a user enters a username, which is received by the authentication system. Processing continues to 506.

At 506, the user enters a password that is received by the system. Processing continues to 508.

At 508, it is determined if the credentials match stored credentials for the user. If the credentials match, processing continues to 510, otherwise processing returns to 506.

At 510, an OTP is sent to the user. Processing continues to 512.

At 512, the user enters the OTP and it is received by the system. Processing continues to 514.

At 514, it is determined whether the OTP timer has expired. If so, processing continues to 516, otherwise processing continues to 518.

At 516, the user is prompted that the OTP timer has expired and processing returns to 510.

At 518, it is determined whether the correct OTP was entered. If so, processing continues to 520, otherwise processing returns to 512.

At 520, a session is started for the user. Processing continues to 522, where processing ends for the login process.

FIG. 6 is a flowchart showing an example reauthentication process 600 in accordance with some implementations. Processing begins at 602 with a session timeout indication and continues to 604.

At 604, the reauthentication process is started in response to the session timeout. Processing continues to 606.

At 606, the user enters the PassText. Processing continues to 608.

At 608, it is determined if the entered PassText matches the stored PassText (e.g., by comparing hash values of the entered PassText and the stored PassText). If the two match, processing continues to 610, otherwise processing returns to 606. Processing continues to 612, where processing ends for the reauthentication process.

FIG. 7 is a flowchart show an example PassText reset process 700 in accordance with some implementations. The reset process 700 includes two types of reset: a PassText change (702-726) and a forgotten PassText (728-748). The sequence followed depends on an indication received of the type of reset being requested by a user.

Processing for the PassText change reset begins at 702 and continues to 704.

At 704, the user enters PassText and it is received by the authentication system. Processing continues to 706.

At 706, it is determined if the PassText matches the stored PassText. If so, processing continues to 708, otherwise processing returns to 704.

At 708, the user enters new PassText and it is received by the system. Processing continues to 710.

At 710, it is determined whether the new PassText matches the old PassText. If so, processing returns to 708, otherwise processing continues to 712.

At 712 an OTP is sent to the user. Processing continues to 714.

At 714, the user enters the OTP and it is received by the system. Processing continues to 716.

At 716, it is determined whether the OTP timer has expired. If so, processing continues to 718, otherwise processing continues to 720.

At 718, the user is prompted that the OTP timer has expired and processing returns to 712.

At 720, it is determined whether the correct OTP was entered. If so, processing continues to 722, otherwise processing returns to 714.

At 722, a salted hash of the new PassText and the user credentials are stored in the database. Processing continues to 724.

At 724, the user is prompted that the PassText change was successful. Processing continues to 726, where processing ends for the PassText change reset process.

Processing for the forgotten PassText reset begins at 728 and continues to 730.

At 730, an OTP is sent to the user. Processing continues to 732.

At 732, the user enters the OTP and it is received by the system. Processing continues to 734.

At 734, it is determined whether the OTP timer has expired. If so, processing continues to 736, otherwise processing continues to 738.

At 736, the user is prompted that the OTP timer has expired and processing returns to 730.

At 738, it is determined whether the correct OTP was entered. If so, processing continues to 740, otherwise processing returns to 732.

At 740, the user enters new PassText and the new PassText is received by the system.

Processing continues to 742.

At 742, it is determined whether the new PassText matches the old PassText. If so, processing returns to 740, otherwise processing continues to 744.

At 744, a salted hash of the new PassText and the user credentials are stored in the database. Processing continues to 746.

At 746, the user is prompted that the PassText change was successful. Processing continues to 748, where processing ends for the forgot PassText reset process.

FIG. 8 is a flowchart showing an example deactivation process 800 in accordance with some implementations. Processing begins at 802 where a user logs in and continues to 804.

At 804, the deactivation process starts and continues to 806.

At 806, the user enters his/her username. Processing continues to 808.

At 808, an OTP is sent to the user. Processing continues to 810.

At 810, the user enters the OTP and it is received by the system. Processing continues to 812.

At 812, it is determined whether the OTP timer has expired. If so, processing continues to 814, otherwise processing continues to 816.

At 814, the user is prompted that the OTP timer has expired and processing returns to 808.

At 816, it is determined whether the correct OTP was entered. If so, processing continues to 818, otherwise processing returns to 810.

At 818, the user account is marked as deactivated in the database. Processing continues to 820.

At 820, the user is prompted that the deactivation was successful. Processing continues to 822, where the processing ends for the deactivation process.

Sequence diagrams are used to demonstrate these interactions and relationships between the components and show how processes function with one another and in what sequence.

FIG. 9 is a diagram of an example registration and activation sequence in accordance with some implementations. For example, the sequence shown in FIG. 9 can be similar to the method described above in connection with FIG. 4.

FIG. 10 is a diagram of an example login sequence in accordance with some implementations. For example, the sequence shown in FIG. 10 can be similar to the method described above in connection with FIG. 5.

FIG. 11 is a diagram of an example reauthentication sequence in accordance with some implementations. For example, the sequence shown in FIG. 11 can be similar to the method described above in connection with FIG. 6.

FIG. 12 is a diagram of an example deactivation sequence in accordance with some implementations. For example, the sequence shown in FIG. 12 can be similar to the method described above in connection with FIG. 8.

FIG. 13 is a diagram of an example PassText reset/change sequence in accordance with some implementations. For example, the sequence shown in FIG. 13 can be similar to the method described above in connection with FIG. 7.

FIG. 14 is a diagram of an example PassText reset-forgot sequence in accordance with some implementations. For example, the sequence shown in FIG. 14 can be similar to the method described above in connection with FIG. 7.

Figure 15:
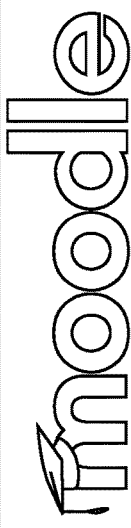
FIG. 15 is a diagram of an example registration graphical user interface in accordance with some implementations.

FIG. 15 is a diagram of an example registration graphical user interface (GUI) 1500 in accordance with some implementations. The GUI 1500 includes a user name element 1502, an email element 1504, a phone number element 1506, a text element 1508 and a next button 1510. The GUI 1500 can be displayed during a registration process such as that described in connection with FIG. 4.

Figure 16:
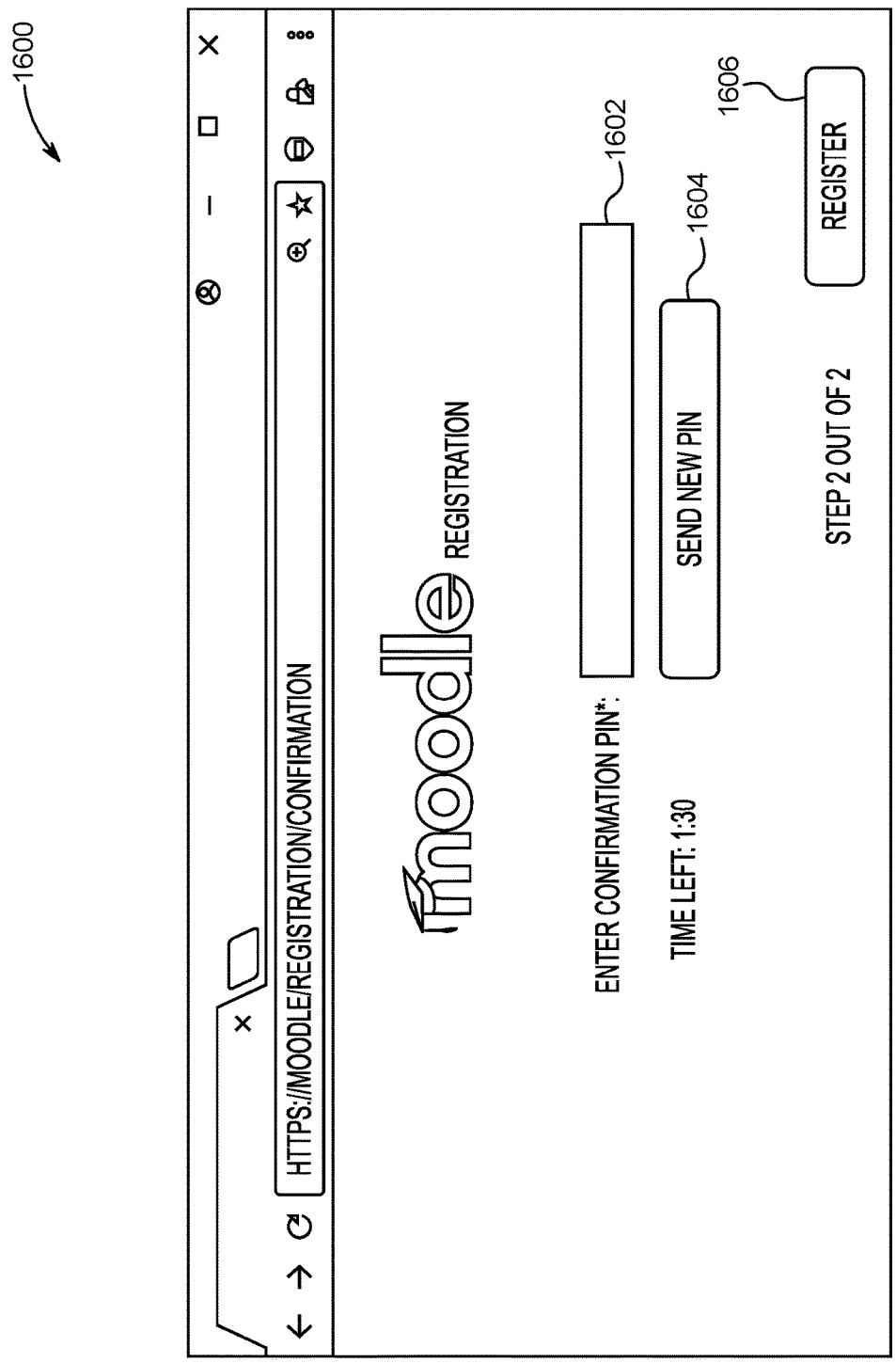
FIG. 16 is a diagram of an example registration graphical user interface in accordance with some implementations.

FIG. 16 is a diagram of an example registration GUI 1600 in accordance with some implementations. The GUI 1600 includes a PIN element 1602, a send new PIN element 1604, and a register button 1606. The GUI 1600 can be displayed as part of a registration process to receive a second factor authentication PIN in connection with a process such as that described above in connection with FIG. 4.

FIG. 17 is a diagram of an example login interface for a first authentication factor GUI 1700 in accordance with some implementations. The GUI 1700 includes a user name element 1702, a text element 1704, a forgot PassText element 1706, and a next button 1708. The GUI 1700 can be used in a login process similar to that described in connection with FIG. 5.

Figure 18:
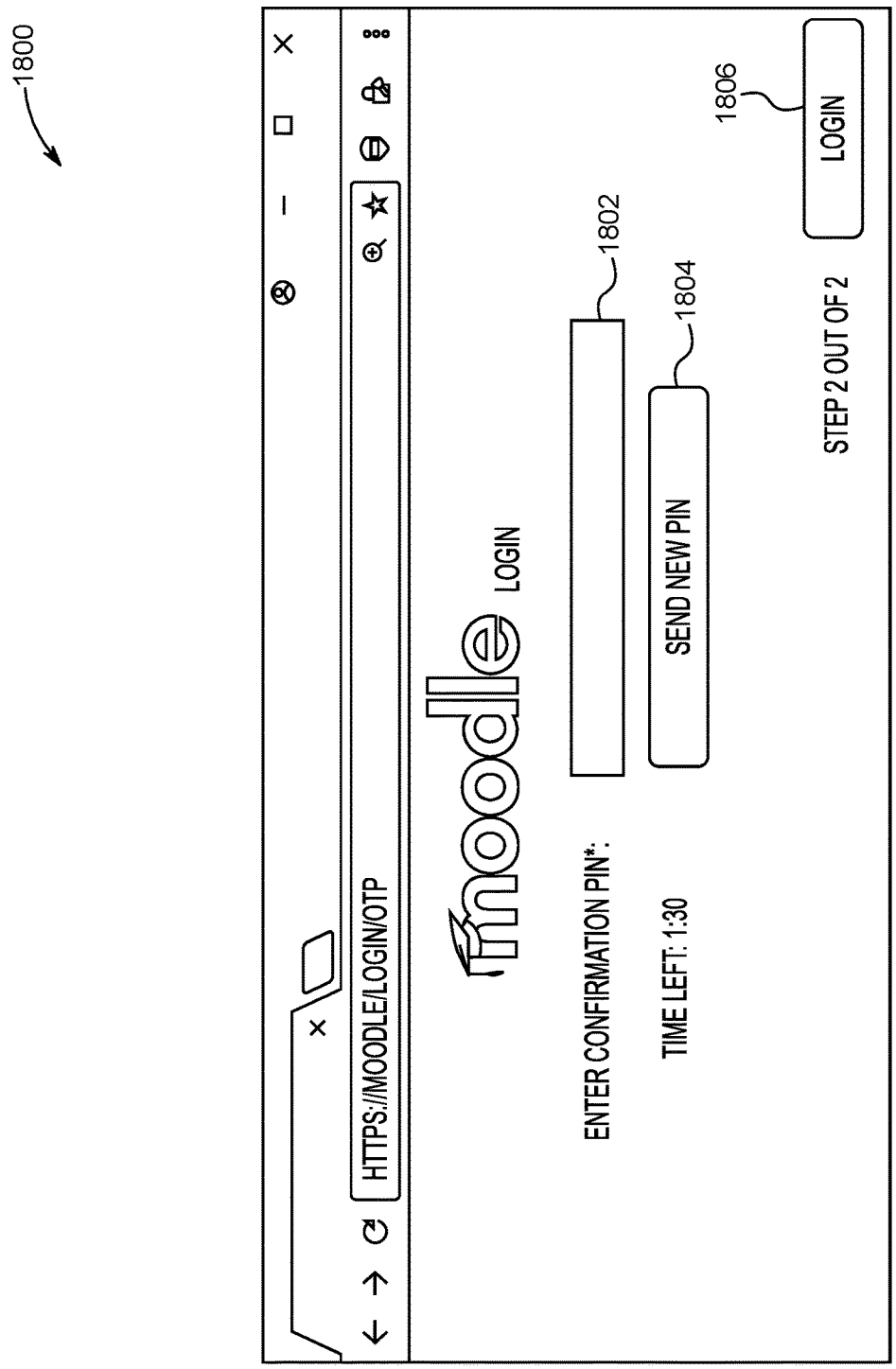
FIG. 18 is a diagram of an example login interface for a second authentication factor in accordance with some implementations.

FIG. 18 is a diagram of an example login interface for a second authentication factor GUI 1800 in accordance with some implementations. The GUI 1800 includes a PIN element 1802, a send new PIN button 1804, and a login button 1806. The GUI 1800 can be used in a login process similar to that described in connection with FIG. 5.

Figure 19:
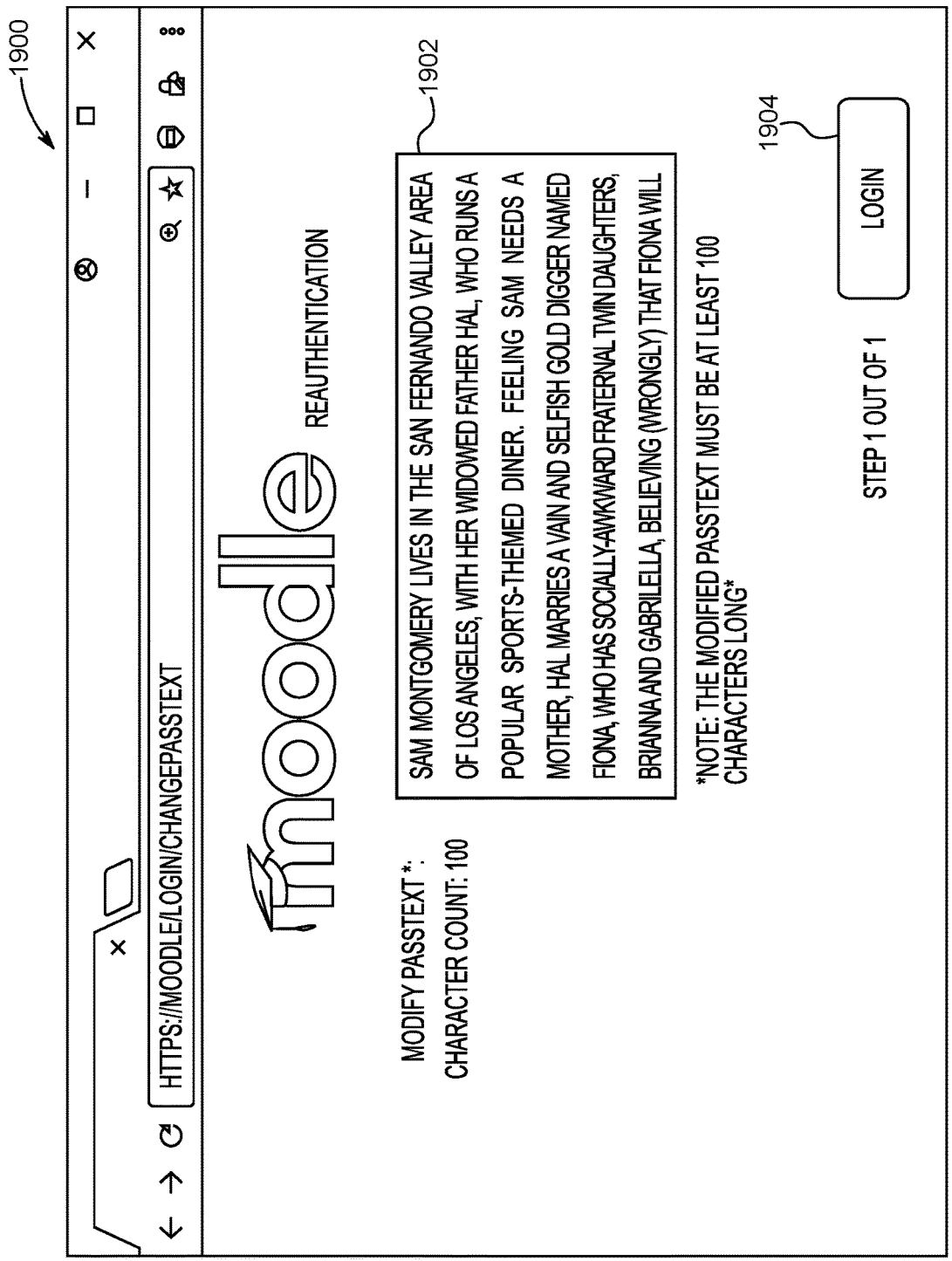
FIG. 19 is a diagram of an example graphical user interface for reauthentication in accordance with some implementations.

FIG. 19 is a diagram of an example GUI 1900 for reauthentication in accordance with some implementations. The GUI 1900 includes a modify PassText element 1902 and a login element 1904. The GUI 1900 can be used in a login process similar to that described in connection with FIG. 6.

Figure 20:
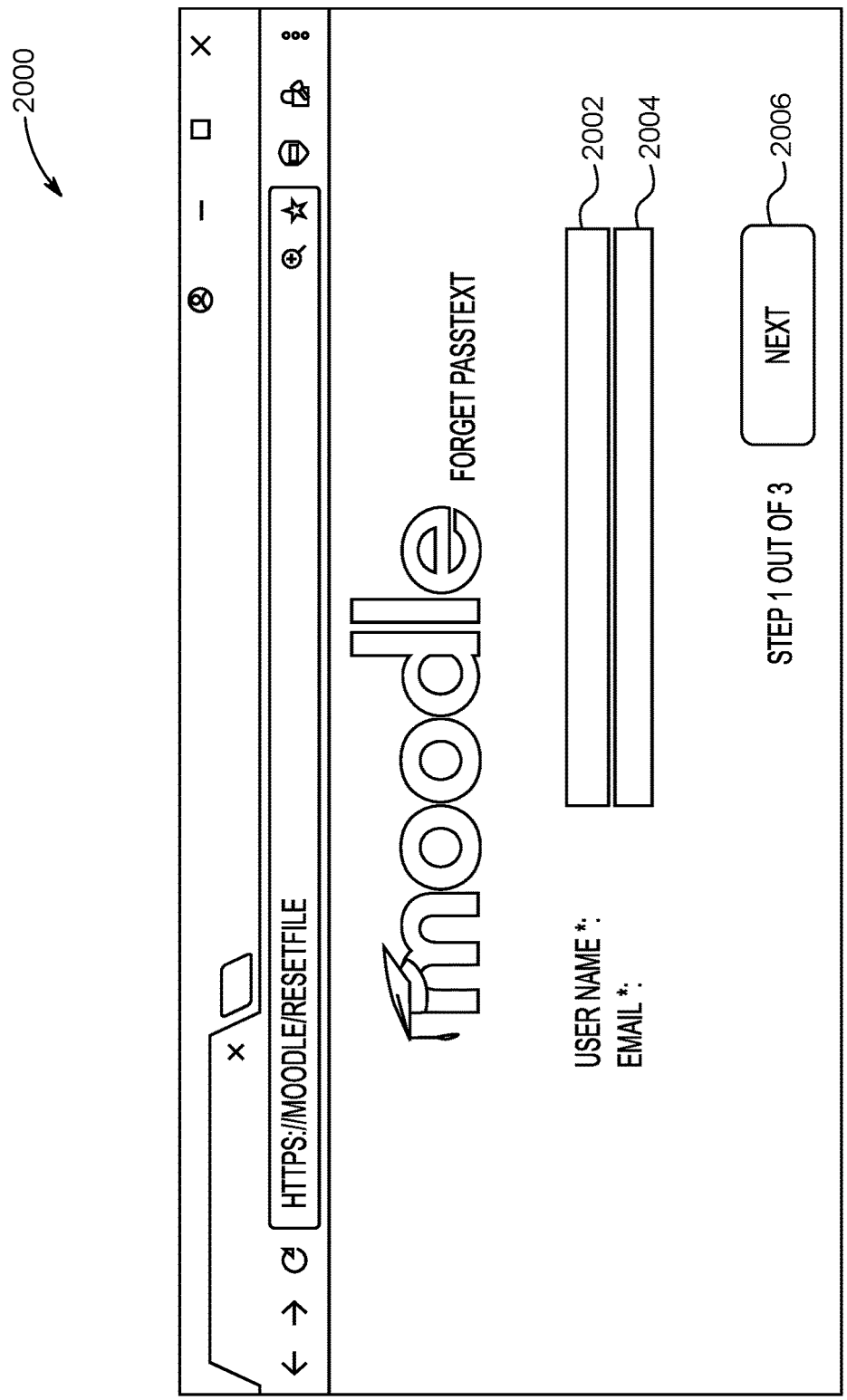
FIG. 20 is a diagram of an example graphical user interface for a forgotten PassText situation in accordance with some implementations.

FIG. 20 is a diagram of an example GUI 2000 for a forgotten PassText situation in accordance with some implementations. The GUI 2000 includes a user name element 2002, an email element 2004, and a next button 2006.

Figure 21:
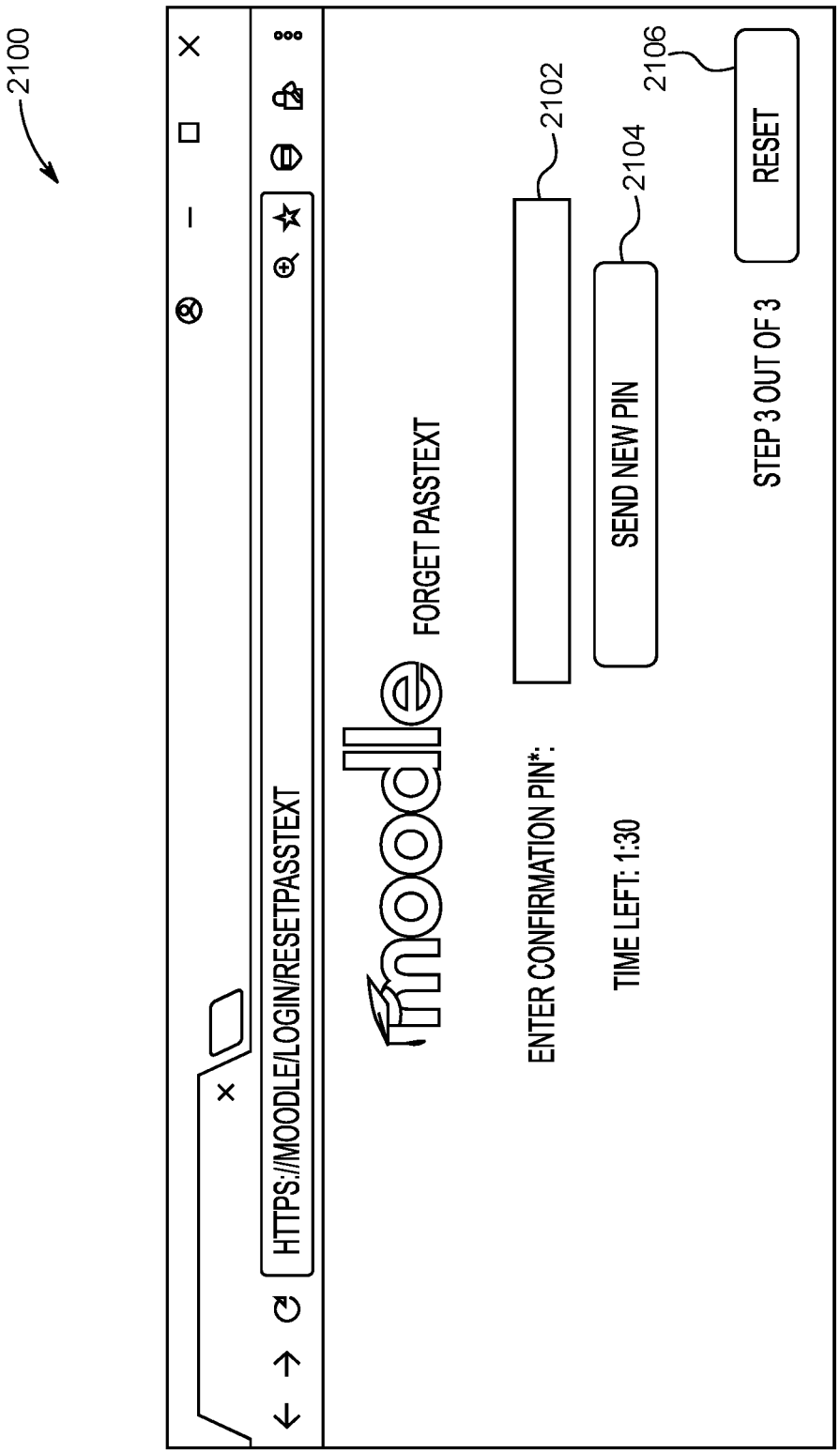
FIG. 21 is a diagram of an example graphical user interface for a forgotten PassText situation in accordance with some implementations.

FIG. 21 is a diagram of an example GUI 2100 for a forgotten PassText situation in accordance with some implementations. The GUI 2100 includes a PIN confirmation element 2102, a send new PIN element 2104, and a reset button 2106.

Figure 22:
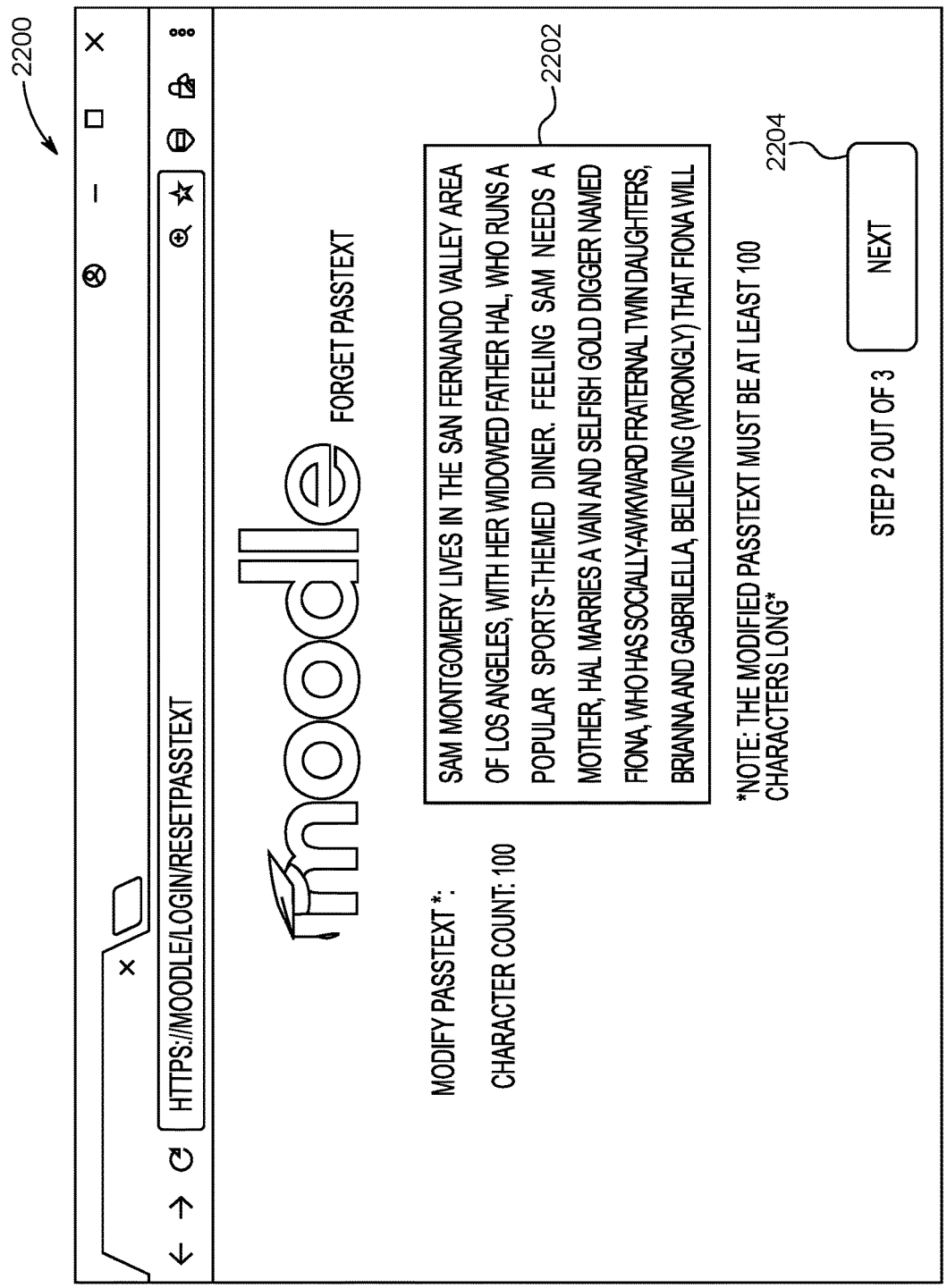
FIG. 22 is a diagram of an example graphical user interface for a forgotten PassText situation in accordance with some implementations.

FIG. 22 is a diagram of an example GUI 2200 for a forgotten PassText situation in accordance with some implementations. The GUI 2200 includes a modify PassText element 2202 and a next button 2204.

GUIs 2000, 2100, and 2200 can be used for a forgotten PassText situation similar to the process described in connection with FIG. 7.

Figure 23:
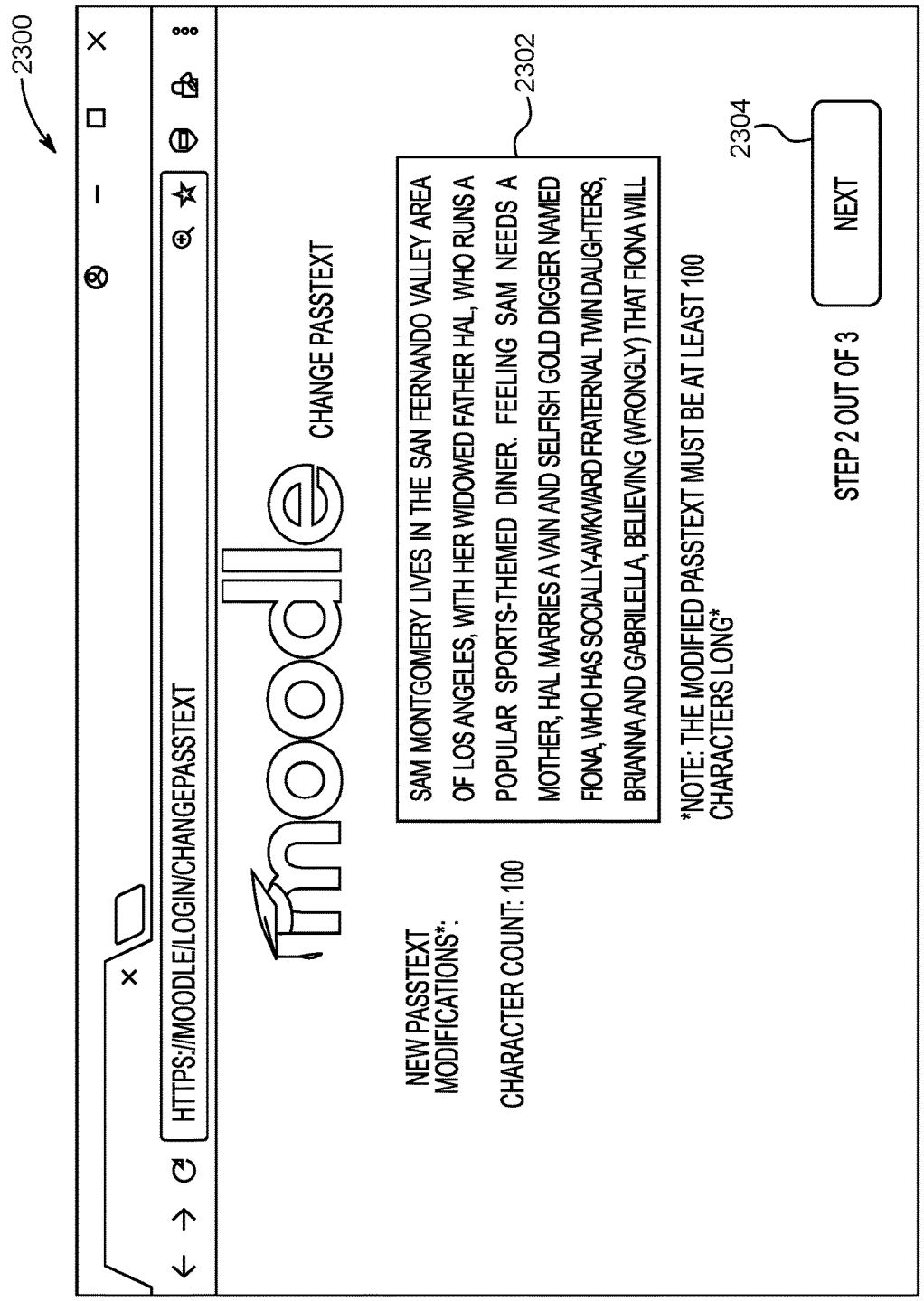
FIG. 23 is a diagram of an example graphical user interface for changing a PassText in accordance with some implementations.

FIG. 23 is a diagram of an example GUI 2300 for changing a PassText in accordance with some implementations. The GUI 2300 includes a new PassText element 2302, and a next button 2304.

Figure 24:
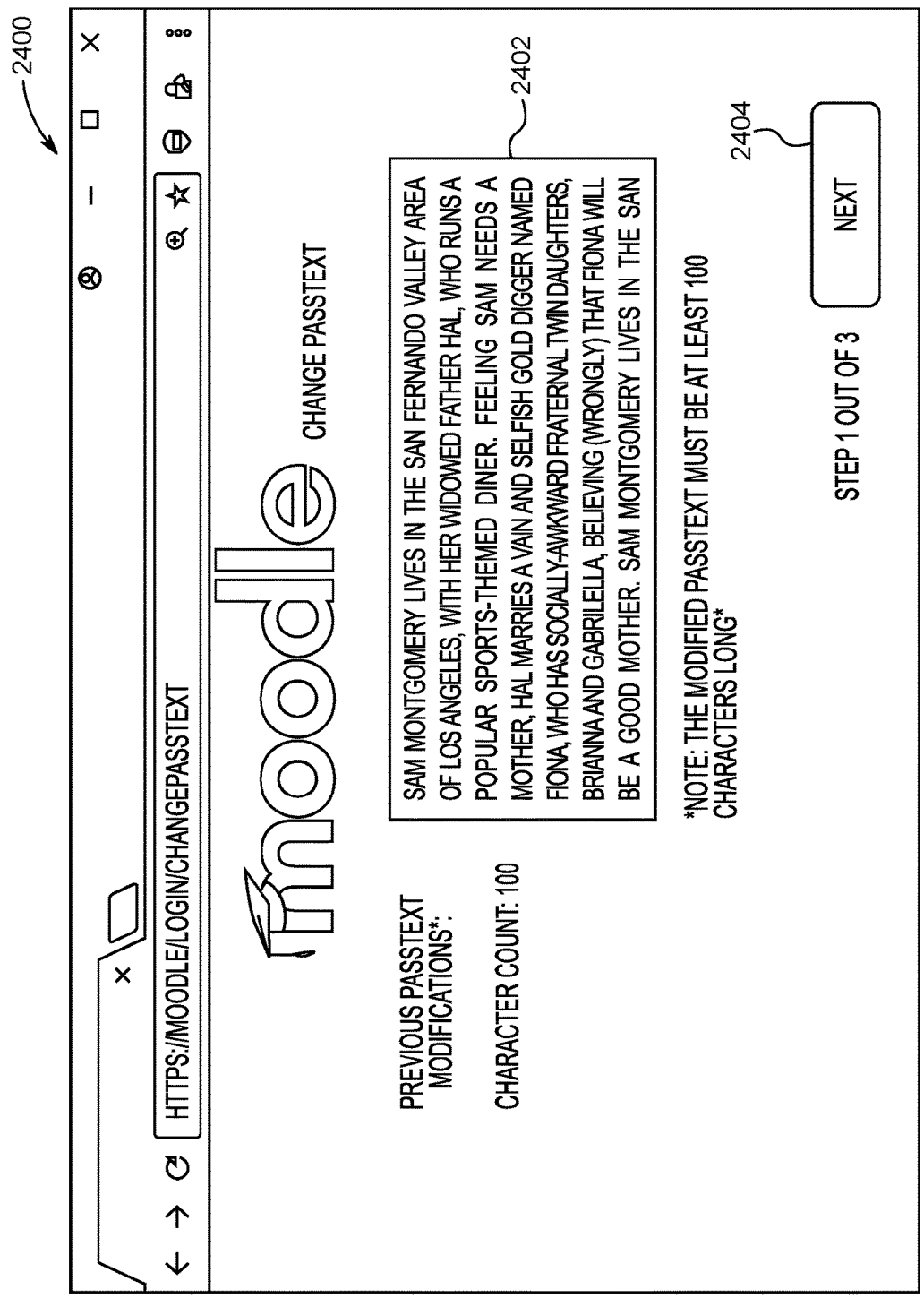
FIG. 24 is a diagram of an example graphical user interface for changing a PassText in accordance with some implementations.

FIG. 24 is a diagram of an example GUI 2400 for changing a PassText in accordance with some implementations. The GUI 2400 includes a previous PassText modifications element 2402, and a next button 2404.

Figure 25:
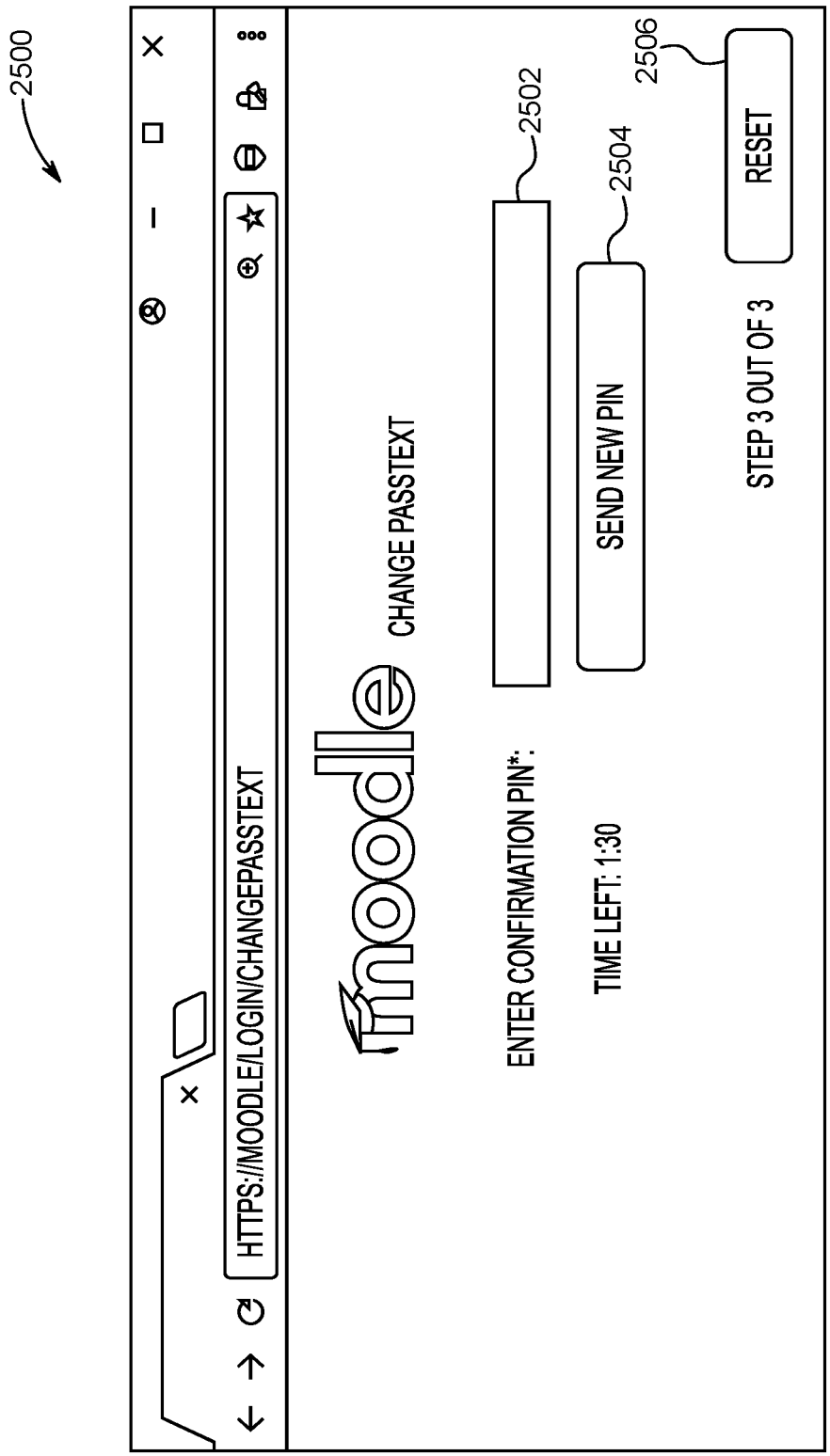
FIG. 25 is a diagram of an example graphical user interface for changing a PassText in accordance with some implementations.

FIG. 25 is a diagram of an example GUI 2500 for changing a PassText in accordance with some implementations. The GUI 2500 includes a confirmation PIN element 2502, a send new PIN element 2504, and a reset button 2506.

GUIs 2300, 2400, and 2500 can be used in a change PassText process similar to that described in connection with FIG. 7.

Figure 26:
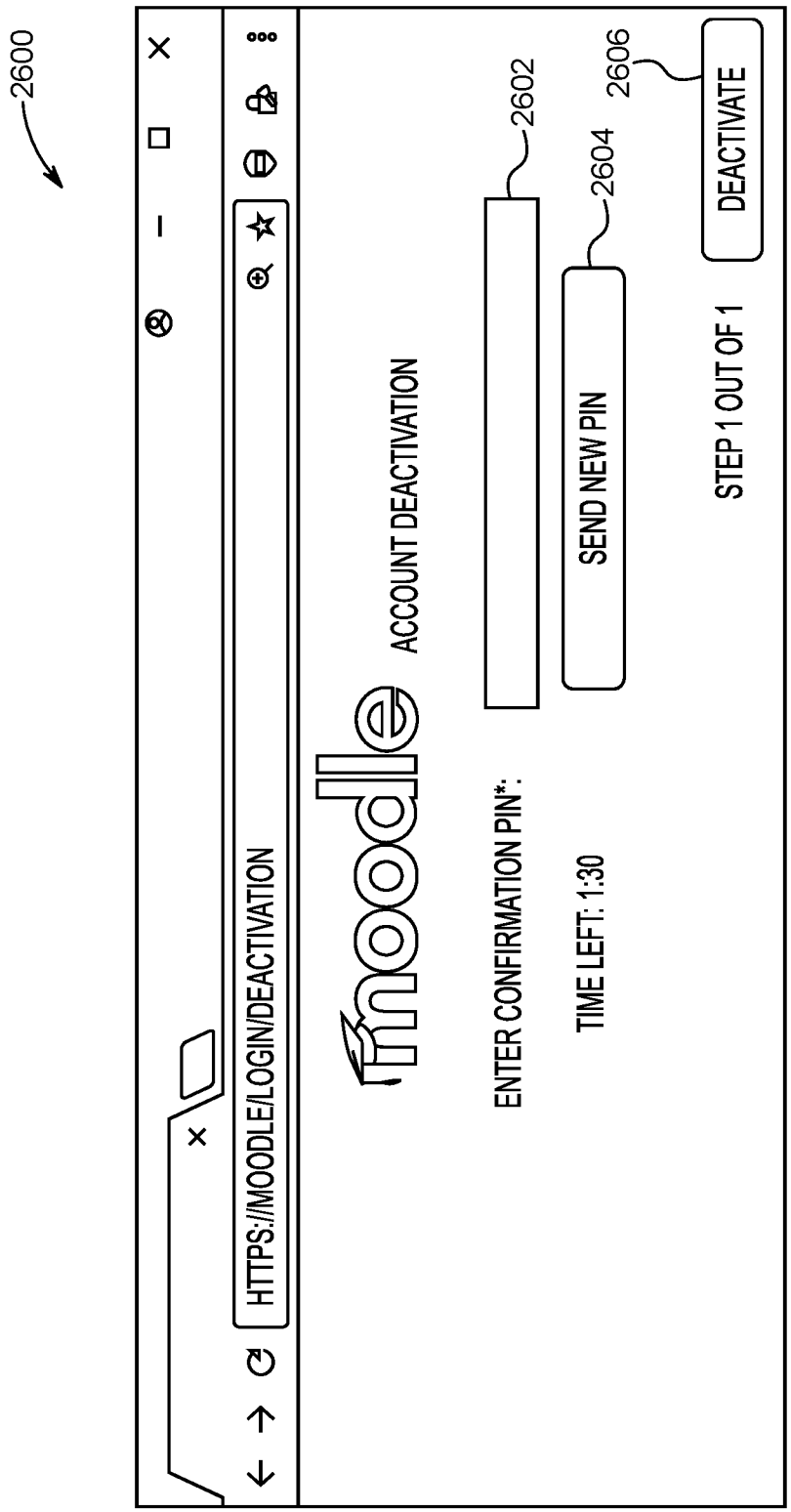
FIG. 26 is a diagram of an example graphical user interface for deactivation in accordance with some implementations.

FIG. 26 is a diagram of an example GUI 2600 for deactivation in accordance with some implementations. The GUI 2600 includes a confirmation PIN element 2602, a send new PIN element 2604, and a deactivate button 2606. GUI 2600 can be used in an account deactivation process.

There may be security threats that can put the proposed authentication system in risk, as described below along with possible mitigations to reduce the risk likelihood.

The following are possible threats that might affect the PassText method and system of the present disclosure:

1) SQL Injection (SQLI)

SQL injection is a database related vulnerability that many websites have. In simple words, SQL injection attack occurs when the user is asked to enter data into a text field, like entering username or ID. However, instead of entering the ID, the attacker can enter some clever input to manipulate the SQL query 2) Cross Site Scripting (XSS)

Cross-site Scripting (XSS) is a vulnerability that allows the attacker to inject his own JavaScript code into the website while waiting for other visitors to visit that website. When they do, the JavaScript code will be automatically downloaded into their computers and executed there. However, usually, attackers use this vulnerability for plenty of purposes other than vandalism such as stealing sensitive data.

3) Session Hijacking

Session hijacking could be done by stealing the victim's cookies, which are files used to store the user's data on his own machine whenever he visits a certain website. This can include some private data such as session id and password. Once the session is hijacked, the attacker can login as the victim without anyone noticing. As a result, stealing cookies would put the user's privacy in a great danger.

4) Guessing Attack

A guessing attack is an attack that occurs when the user sets a predictable or easy to guess secret. For instance, a possible scenario when PassText is modified, the user might delete the whole text and replace it with his name.

5) Brute Force Attack

Brute force is an attack where the attacker tries all possible combinations until he cracks the system. The disclosed authentication system is resistant to such an attack. However, if the user decides to delete the PassText contents and replace it with a short text, a brute force attack may be successful. Also, OTP, which is a second authentication factor, is usually short for user's usability, which makes it vulnerable to brute force if not implemented properly.

6) Dictionary Attack

A dictionary attack is also known as 'wordlist attack', where the attacker tries to crack the system using a prewritten text file that contains a long list of possible passwords, or in this case, PassTexts. Like the brute force attack case, inherently, an implementation of the disclosed authentication system is not vulnerable to dictionary attack. However, sometimes, the user might modify the PassText in a way that decreases the system's security.

7) Sniffing Attack

Sniffing is the process of capturing network packets using sniffing tools such as 'Wireshark'. In this scenario, the attacker might sniff the hash while it is transmitted to the database, which might threaten the system's confidentiality levels.

Discussed below are some example mitigations in order to help reduce or eliminate the attacks mentioned herein.

1) Input Validation

In simple words, input validation refers to checking the input to ensure it is legitimate. Input validation can be used to prevent malicious text such as '105 OR 1=1' used to implement SQL injection or '<script></script>' used to implement XSS attack. Furthermore, in our design we specify that the PassText should be no less than 100 characters. The purpose of setting a minimum limit is to provide guessing attacks, where some users might delete the whole file and replace it with something short and predictable such as their name or birthday. Also, by setting a minimum limit of 100 characters brute force and dictionary attacks are prevented.

2) Wrong Login Lockout

Wrong login lockout can help prevent the user from accessing the system after a certain number of failed attempts. For example, the user is blocked after 3 failed login attempts. This criterion has a major role in preventing guessing attacks, where the attacker is given 3 attempts only. The same goes for brute force and dictionary attacks.

3) Session Timer

Session timer can be used to address a session hijack attack by ending the old session and starting a new one. Also, setting a session timer can be used after sending an OTP, which helps in preventing brute force attacks since the attacker will not be able to try a large number of passwords in a short time period. For example, the OTP session time duration can be one and a half minutes.

4) Encryption

To prevent sniffing attacks, the traffic can be encrypted to maintain confidentiality. For example, using HTTPS protocol, which adds a layer of SSL encryption to HTTP.

Table 9 summarizes the threats and their mitigations, and FIG. 26 shows a misuse cases diagram.

TABLE 9

| Threat | Violated Function | Mitigation |
| --- | --- | --- |
| XSS/SQLi | Register Login Reauthentication | Input validation |
| Guessing attack | Login Reauthentication | Input validation Wrong login lockout |
| Dictionary attack | Login Reauthentication | Input validation Wrong login lockout |
| Brute force | Login Reauthentication | Wrong login lockout Session timer |
| Session hijack | Login Reauthentication | Session timer |
| Sniffing | Register Login Reauthentication | Encryption |

Figure 27:
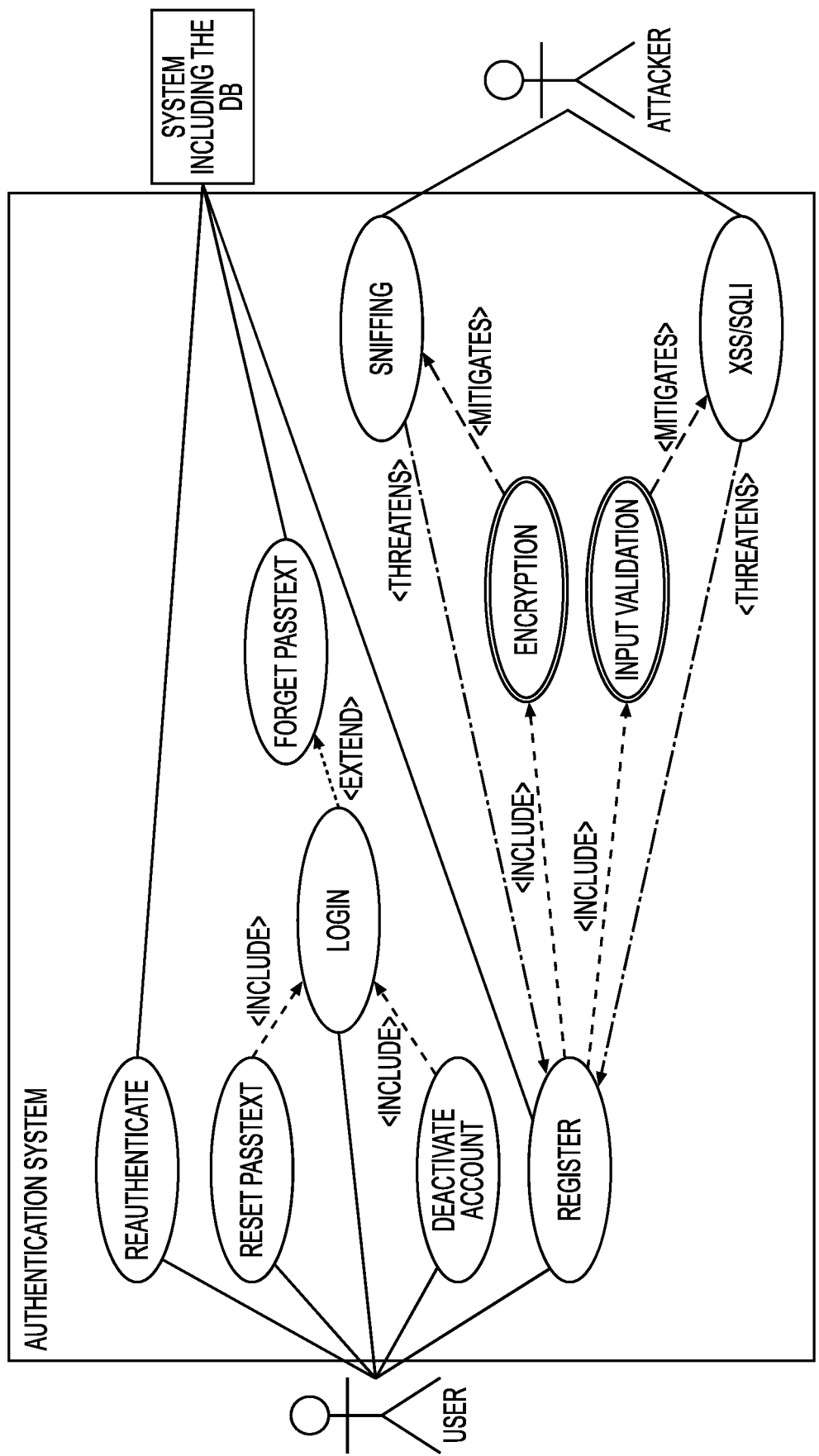
FIG. 27 is a diagram of an example use case of registration misuse in accordance with some implementations.

FIG. 27 is a diagram of an example use case of registration misuse in accordance with some implementations.

Figure 28:
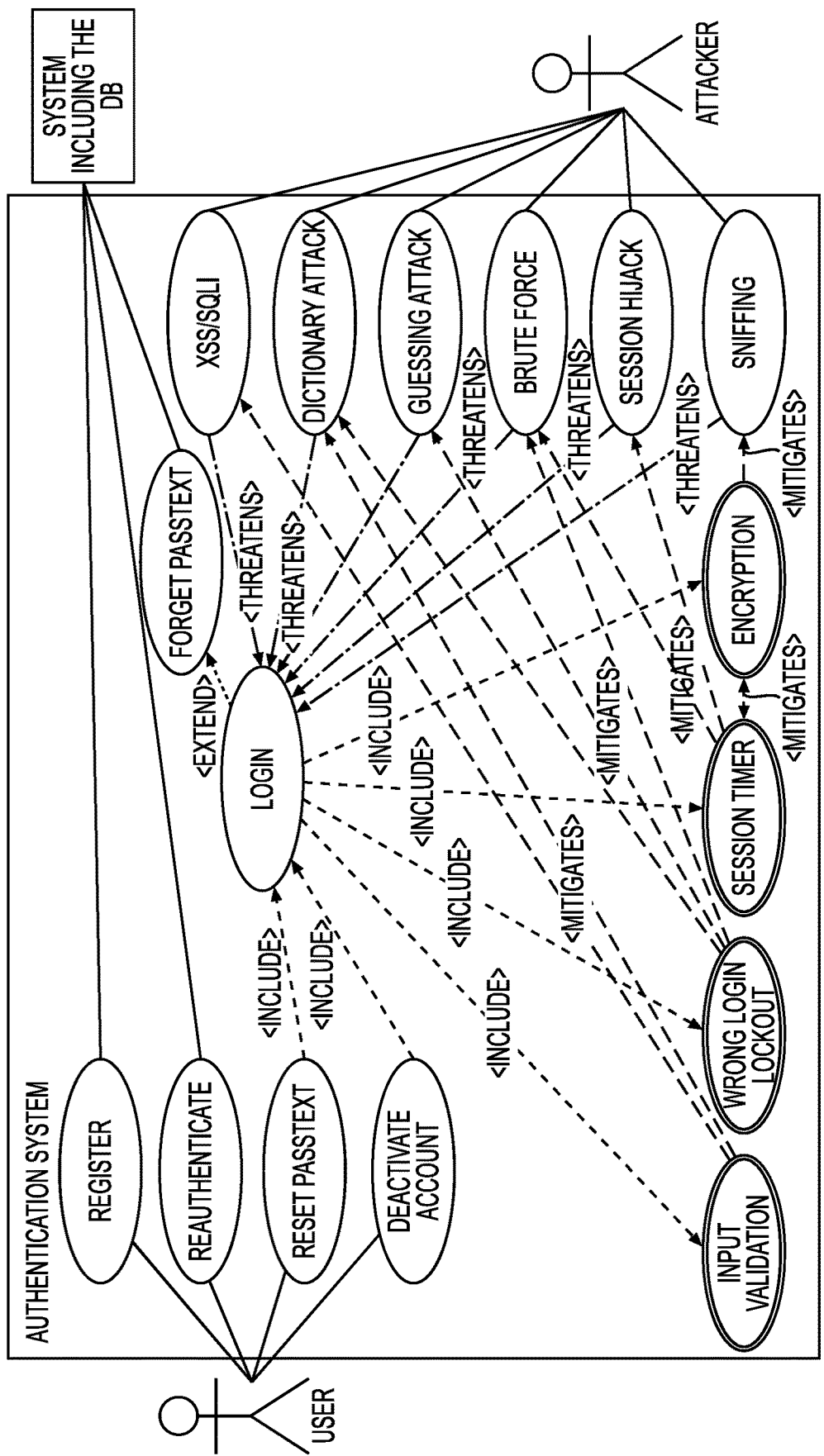
FIG. 28 is a diagram of an example use case of login misuse in accordance with some implementations.

FIG. 28 is a diagram of an example use case of login misuse in accordance with some implementations.

Figure 29:
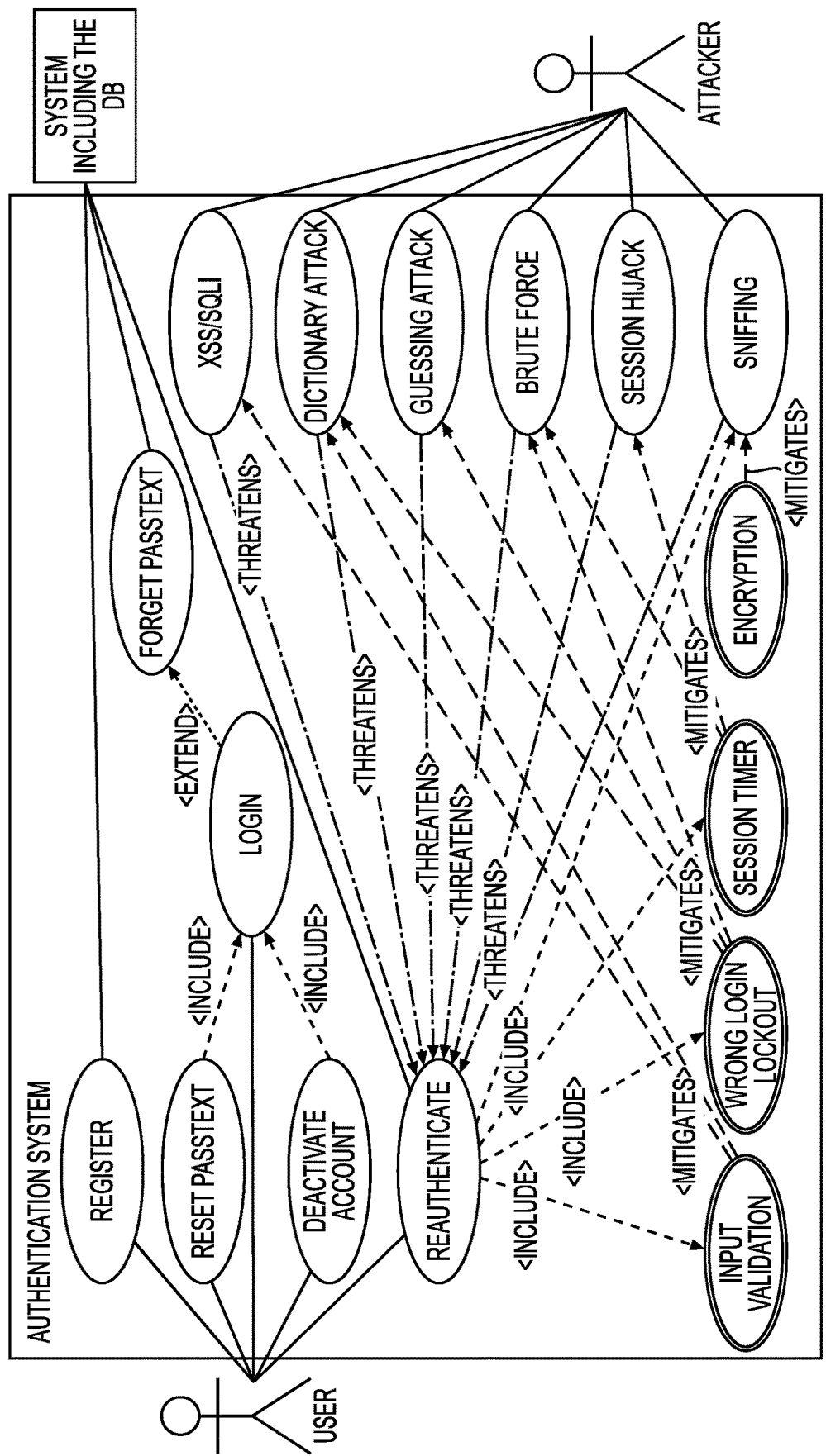
FIG. 29 is a diagram of an example use case of login misuse in accordance with some implementations.

FIG. 29 is a diagram of an example use case of login misuse in accordance with some implementations.

Security and convenience are usually viewed as opposite entities, when one increases, the other usually decreases. However, PassText can help to increase both security and convenience at the same time in conjunction with OTP.

Conventional authentication methods suffer from drawbacks in one way or another, due to security/convenience trade off. However, PassText stands out from conventional authentication methods by compensating for these drawbacks. The disclosed PassText authentication method and system include a new authentication method based on modifying a text file and storing the hash of the modified file as a secret. This method enhances security on many levels since applying guessing attack on the PassText, unlike the password, is almost impossible.

Furthermore, the disclosed method and system can provide protection against brute force attacks since the PassText is longer than the password and has much more characters. The system is protected against dictionary attacks since the file modifications cannot be predicted easily. To enhance security even more, some implementations combine OTP with PassText to provide a second factor of authentication. Memorizing the changes made to PassText can be easier than remembering a certain password, for which length and security are affected by the shortage of human memory. Some implementations can provide numerous advantages including speed, cost and ease of implementation. Also, to make the user's life easier, a system may have the user log in with two factors at the beginning and reauthenticating with one factor only (e.g., PassText).

Furthermore, it is important to take all possible attack vectors into consideration, since the system is only as strong as its weakest link. Also, it is important to note that a successful authentication method does not depend on security alone. Therefore, other factors including user convenience, speed, accuracy and cost can turn the tables when it comes to choosing the best authentication method.

Some implementations can have an impact on both users and society. Users will not have to remember complicated passwords anymore, all what they have to remember is a simple modification which makes their lives much easier. Also, the penetration testing software industry may be affected because the disclosed solution is immune to dictionary and brute force attacks, which makes cracking tools of little or no use. Also, PassText is resilient and can be used with authentication factors other than OTP, which can affect biometrics industry. For instance, for systems that require maximum security protection, iris authentication and PassText would make a suitable combination.

Some implementations can include ensuring that the transmission channels are encrypted in order to sustain complete confidentiality. In some implementations, the "Forgot PassText" function can include an additional authentication factor to augment the OTP.

Figure 30:
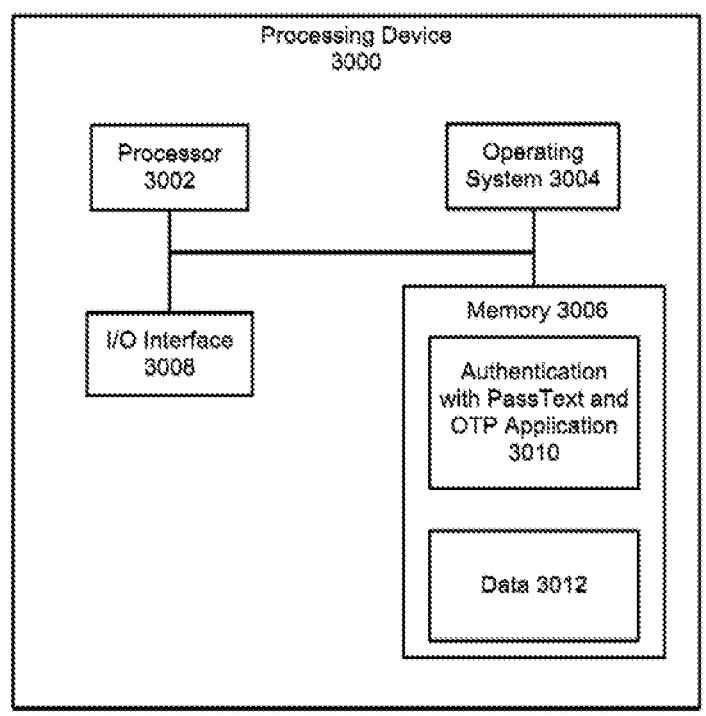
FIG. 30 is a diagram of an example processing device configured for compiling concise expressive design pattern source code in accordance with some implementations.

FIG. 30 is a block diagram of an example processing device 3000 which may be used to implement one or more features described herein. In one example, device 3000 may be used to implement a computer device including an authentication system (e.g., 102), and perform appropriate method implementations described herein (e.g., one or more of the steps shown in FIGS. 4-8). Device 3000 can be any suitable computer system, server, or other electronic or hardware device. For example, the device 3000 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 3000 includes a processor 3002, an operating system 3004, a memory 3006, and input/output (I/O) interface 3008.

Processor 3002 can be one or more processors and/or processing circuits to execute program code and control basic operations of the device 3000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 3006 is typically provided in device 3000 for access by the processor 3002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 3002 and/or integrated therewith. Memory 3006 can store software operating on the device 3000 by the processor 3002, including an operating system 704, one or more applications 3010, and messaging/chat session data 3012. In some implementations, applications 3010 can include instructions that enable processor 3002 to perform the functions described herein, e.g., some or all of the methods of FIGS. 4-8.

For example, applications 3010 can include an extended compiler having extensions for compiling concise expressive design pattern source code elements as described herein. Any of software in memory 3004 can alternatively be stored on any other suitable storage location or computer-readable medium. In addition, memory 3004 (and/or other connected storage device(s)) can store compiler extensions, node factory information, and other instructions and data used in the features described herein. Memory 3004 and any other type of storage (magnetic disk, optical disk, magnetic tape, or other tangible media) can be considered "storage" or "storage devices."

I/O interface 3008 can provide functions to enable interfacing the processing device 3000 with other systems and devices. For example, network communication devices, storage devices (e.g., memory and/or database), and input/output devices can communicate via interface 708. In some implementations, the I/O interface 3008 can connect to interface devices including input devices (keyboard, pointing device, touchscreen, microphone, camera, scanner, etc.) and/or output devices (display device, speaker devices, printer, motor, etc.).

For ease of illustration, FIG. 30 shows one block for each of processor 3002, memory 3006, I/O interface 3008, and software block 3010. These blocks may represent one or more processors or processing circuitries, operating systems, memories, I/O interfaces, applications, and/or software modules. In other implementations, device 3000 may not have all of the components shown and/or may have other elements including other types of elements instead of, or in addition to, those shown herein.

In general, a computer that performs the processes described herein (e.g., one or more of the methods of FIGS. 4-8) can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. An authentication method comprising
a registration method of creating a record in a user table to store information corresponding to the user, the registration method including:
receiving user credentials;
providing initial text for modification by a user associated with the user credentials;
receiving first modified text, the first modified text containing one or more modifications provided by the user;
generating a first hash value based on a hash function of the initial text;
generating a second hash value based on a hash function of the first modified text;
comparing the first hash value and the second hash value;
if the first hash value matches the second hash value, requesting the user to modify the initial text;
if the first hash value does not match the second hash value, performing an operation including:
creating the record in the user table to store the information corresponding to the user including the second hash value, wherein the information includes the modified text; and
sending the user a first one-time password via email to verify that the user is an owner of an email address provided by the user.

2. The authentication method of claim 1, further comprising
a login method that occurs after the registration, including:
receiving a username;
receiving second modified text;
generating a third hash value based on the hash function of the first modified text;
comparing the third hash value to the second hash value;
if the third hash value matches the second hash value, performing operations including:
sending the user a second one-time password via email;
receiving a password from the user; and
if the password received from the user matches the second one-time password sent via email, starting a session for the user.

3. The authentication method of claim 2, further comprising:
determining that a time duration for the session has expired;
reauthenticating the user by requesting the second modified text to be input again;
receiving newly input said second modified text;
generating a fourth hash value based on a hash function of the newly input said second modified text;
comparing the fourth hash value with the second hash value;
if the fourth hash value matches the second hash value, starting a new session for the user; and
if the fourth hash value does not match the second hash value, permitting the user to retry providing the second modified text a given number of times and repeating the generating and comparing on the second modified text received via retry attempts.

4. The authentication method of claim 3, further comprising detecting that a reset process is to be performed based on one of detecting a user request to perform a reset process or detecting user input indicating forgotten modified text.

5. The authentication method of claim 4, further comprising:
when the user request to perform the reset process is detected, performing operations including:
requesting third modified text from the user;
receiving the third modified text from the user in response to the request to perform the reset process;
generating a fifth hash value on the modified text received from the user in response to the request to perform the reset process;
comparing the fifth hash value to the second hash value;
if the fifth hash value matches the second hash value, providing a prompt for the user to enter new modified text; and
if the fifth hash value does not match the second hash value, sending the user a one-time password via email to permit the user to enter new modified text when the one-time password is received,
wherein a new hash value is generated from the new modified text and the new hash value is stored as the second hash value.

6. The authentication method of claim 4, further comprising:
when user input indicating the forgotten modified text is detected, performing operations including:

sending the user a one-time password via email to permit the user to enter new modified text when the one-time password is received,
wherein a new hash value is generated from the new modified text and the new hash value is stored as the second hash value.

7. The authentication method of claim 4, further comprising:
detecting an indication that a user account has been compromised; and
in response to detecting the indication that the user account has been compromised, sending the user a one-time password via email to permit the user to enter new modified text when the one-time password is received,
wherein a new hash value is generated from the new modified text and the new hash value is stored as the second hash value.

8. The authentication method of claim 1, wherein the credentials include one or more of username, unique identifier, email address, or phone number.

9. The authentication method of claim 1, wherein modification of the initial text includes one or more of changing a portion of the initial text, adding to the initial text, or deleting a portion of the initial text.

10. A non-transitory computer readable medium having instructions stored therein that, when executed by one or more processors, cause the one or more processors to perform an authentication method comprising
a registration method for creating a record in a user table to store information corresponding to the user, the registration method including:
receiving user credentials;
providing initial text for modification by a user associated with the user credentials;
receiving first modified text, the first modified text containing one or more modifications provided by the user;
generating a first hash value based on a hash function of the initial text;
generating a second hash value based on a hash function of the first modified text;
comparing the first hash value and the second hash value;
if the first hash value matches the second hash value, requesting the user to modify the initial text;
if the first hash value does not match the second hash value, performing an operation including:
creating the record in the user table to store the information corresponding to the user including the second hash value, wherein the information includes the first modified text; and
sending the user a first one-time password via email to verify that the user is an owner of an email address provided by the user.

11. The non-transitory computer readable medium of claim 10, wherein the authentication method further comprises
a login method that occurs after the registration, including receiving a username;
receiving second modified text;
generating a third hash value based on the hash function of the first modified text;
comparing the third hash value to the second hash value; and
if the third hash value matches the second hash value, performing operations including:
sending the user a second one-time password via email;
receiving a password from the user; and
if the password received from the user matches the second one-time password sent via email, starting a session for the user.

12. The non-transitory computer readable medium of claim 11, wherein the authentication method further comprises:
determining that a time duration for the session has expired;
reauthenticating the user by requesting the second modified text to be input again;
receiving newly input said second modified text;
generating a fourth hash value based on a hash function of the newly input said second modified text;
comparing the fourth hash value with the second hash value;
if the fourth hash value matches the second hash value, starting a new session for the user;
if the fourth hash value does not match the second hash value, permitting the user to retry providing the second modified text a given number of times and repeating the generating and comparing on the second modified text received via retry attempts.

13. The non-transitory computer readable medium of claim 12, wherein the authentication method further comprises detecting that a reset process is to be performed based on one of detecting a user request to perform a reset process or detecting user input indicating forgotten modified text.

14. The non-transitory computer readable medium of claim 13, wherein the authentication method further comprises:
when the user request to perform the reset process is detected, performing operations including:
requesting third modified text from the user;
receiving the third modified text from the user in response to the request to perform the reset process;
generating a fifth hash value on the modified text received from the user in response to the request to perform a reset process;
comparing the fifth hash value to the second hash value;
if the fifth hash value matches the second hash value, providing a prompt for the user to enter new modified text; and
if the fifth hash value does not match the second hash value, sending the user a one-time password via email to permit the user to enter new modified text when the one-time password is received,
wherein a new hash value is generated from the new modified text and the new hash value is stored as the second hash value.

15. The non-transitory computer readable medium of claim 13, wherein the authentication method further comprises:
when user input indicating the forgotten modified text is detected, performing operations including:
sending the user a one-time password via email to permit the user to enter new modified text when the one-time password is received,
wherein a new hash value is generated from the new modified text and the new hash value is stored as the second hash value.

16. The non-transitory computer readable medium of claim 13, wherein the authentication method further comprises:
detecting an indication that a user account has been compromised; and in response to detecting the indication that the user account has been compromised, sending the user a one-time password via email to permit the user to enter new modified text when the one-time password is received, wherein a new hash value is generated from the new modified text and the new hash value is stored as the second hash value.

17. The non-transitory computer readable medium of claim 10, wherein the credentials include one or more of username, unique identifier, email address, or phone number.

18. The non-transitory computer readable medium of claim 10, wherein modification of the initial text includes one or more of changing a portion of the initial text, adding to the initial text, or deleting a portion of the initial text.

19. An authentication system comprising:
one or more processors coupled to a non-transitory computer readable medium having stored thereon software instructions that, when executed by the one or more processors, cause the one or more processors to perform authentication operations including:
performing registration operations for creating a record in a user table to store information corresponding to the user, the registration operations including:
receiving user credentials;
providing initial text for modification by a user associated with the user credentials;
receiving first modified text, the first modified text containing one or more modifications provided by the user;
generating a first hash value based on a hash function of the initial text;
generating a second hash value based on a hash function of the first modified text;
comparing the first hash value and the second hash value;
if the first hash value matches the second hash value, requesting the user to modify the initial text;
if the first hash value does not match the second hash value, performing an operation including:
creating the record in the user table to store the information corresponding to the user including the second hash value, wherein the information includes the first modified text; and
sending the user a first one-time password via email to verify that the user is an owner of an email address provided by the user.

20. The system of claim 19, wherein the authentication operations further include:
performing login operations after the registration operations, the login operations including:
receiving a username;
receiving second modified text;
generating a third hash value based on the hash function of the first modified text;
comparing the third hash value to the second hash value;
if the third hash value matches the second hash value, performing operations including:
sending the user a second one-time password via email;
receiving a password from the user; and
if the password received from the user matches the second one-time password sent via email, starting a session for the user.

* * * * *